(12) United States Patent
Hatanaka et al.

(10) Patent No.: US 12,191,689 B2
(45) Date of Patent: *Jan. 7, 2025

(54) PORTABLE DEVICE, CHARGING SYSTEM, AND POWER SOURCE CIRCUIT SUBSTRATE

(71) Applicant: K/S HIMPP, Lynge (DK)

(72) Inventors: Takezo Hatanaka, Ibaraki (JP); Hisashi Tsuda, Ibaraki (JP)

(73) Assignee: K/S HIMPP, Lynge (DK)

( * ) Notice: Subject to any disclaimer, the term of this patent is extended or adjusted under 35 U.S.C. 154(b) by 168 days.

This patent is subject to a terminal disclaimer.

(21) Appl. No.: 17/347,277

(22) Filed: Jun. 14, 2021

(65) Prior Publication Data

US 2021/0313837 A1   Oct. 7, 2021

Related U.S. Application Data

(63) Continuation of application No. 16/169,342, filed on Oct. 24, 2018, now Pat. No. 11,056,920, which is a
(Continued)

(30) Foreign Application Priority Data

| Sep. 4, 2013 | (JP) | 2013-183130 |
| Oct. 22, 2013 | (JP) | 2013-218842 |
| Apr. 15, 2014 | (JP) | 2014-083538 |

(51) Int. Cl.
*H02J 7/00* (2006.01)
*H02J 7/04* (2006.01)
(Continued)

(52) U.S. Cl.
CPC .......... *H02J 7/0042* (2013.01); *H02J 7/0044* (2013.01); *H02J 7/04* (2013.01); *H02J 50/12* (2016.02); *H02J 50/80* (2016.02); *H02J 50/90* (2016.02)

(58) Field of Classification Search
CPC ....................................................... H02J 7/04
See application file for complete search history.

(56) References Cited

U.S. PATENT DOCUMENTS 5,907,235 A * 5/1999 Blumenkrantz ...... H02M 3/158
323/283
6,366,678 B1   4/2002 Madaffari et al.
(Continued)

FOREIGN PATENT DOCUMENTS

| DE | 4036479 A1 | 5/1992 |
| DE | 102004059006 A1 | 6/2006 |

(Continued)

OTHER PUBLICATIONS

EP-1727395-A2 translation, Steinbrecher, Method and Apparatus for Charging Hearing Aids Inductively (Year: 2006).*
(Continued)

*Primary Examiner* — Drew A Dunn
*Assistant Examiner* — Tynese V McDaniel
(74) *Attorney, Agent, or Firm* — William W. Cochran; Cochran Preund & Young LLC

(57) ABSTRACT

A portable device including a secondary battery, a plurality of driving components driven by charged power of the secondary battery, a charging unit configured to charge the secondary battery by an input of outside power supplied from outside of the portable device, a plurality of transformation units each configured to output the charged power of the secondary battery at a driving voltage of a corresponding one of the plurality of driving components, a detection unit configured to detect the input of the outside power to the charging unit, and a switching controller configured to switch a state of one of the plurality of transformation units from an operation state to a stopped state responsive to detecting the input of the outside power to the charging unit causing only the corresponding one of the plurality of
(Continued)

driving components to stop operation during charging of the secondary battery.

5 Claims, 16 Drawing Sheets

Related U.S. Application Data continuation of application No. 14/422,233, filed as application No. PCT/JP2014/064335 on May 29, 2014, now Pat. No. 10,218,223.

(51) Int. Cl.
  *H02J 50/12* (2016.01)
  *H02J 50/80* (2016.01)
  *H02J 50/90* (2016.01)

(56) References Cited

U.S. PATENT DOCUMENTS

| | | | | |
|---|---|---|---|---|
| 6,377,826 B1* | 4/2002 | Kaneko | H04B 1/3883 | 455/566 |
| 6,643,151 B1 | 11/2003 | Nebrigic et al. | | |
| 6,791,853 B2* | 9/2004 | Afzal | H02M 3/33561 | 363/142 |
| 7,003,127 B1* | 2/2006 | Sjursen | H04R 25/65 | 381/328 |
| 2002/0074633 A1* | 6/2002 | Larson | H01L 25/16 | 257/E25.029 |
| 2002/0090102 A1* | 7/2002 | Madaffari | H04R 25/505 | 381/355 |
| 2003/0080401 A1 | 5/2003 | Fenner et al. | | |
| 2005/0095498 A1* | 5/2005 | Silverman | H01M 10/44 | 429/61 |
| 2006/0177083 A1 | 8/2006 | Sjursen et al. | | |
| 2007/0121967 A1 | 5/2007 | Sjursen et al. | | |
| 2008/0023625 A1 | 1/2008 | Plank et al. | | |
| 2008/0036417 A1* | 2/2008 | Toya | H02J 7/342 | 320/101 |
| 2008/0089541 A1* | 4/2008 | Preves | H01M 10/0445 | 381/323 |
| 2008/0205678 A1* | 8/2008 | Boguslavskij | H02J 50/10 | 381/312 |
| 2008/0232625 A1* | 9/2008 | Koch | H04R 25/00 | 381/323 |
| 2009/0010462 A1* | 1/2009 | Ekchian | H01M 10/46 | 320/137 |
| 2009/0285426 A1* | 11/2009 | Boguslavskij | H04R 25/554 | 381/323 |
| 2012/0140963 A1* | 6/2012 | Larsen | H02J 50/40 | 381/315 |
| 2012/0189146 A1* | 7/2012 | Wuidart | H04M 1/6066 | 320/108 |
| 2012/0326499 A1* | 12/2012 | Ichikawa | B60L 53/12 | 307/104 |
| 2013/0016862 A1* | 1/2013 | Newton | H04R 25/658 | 381/323 |
| 2013/0088423 A1* | 4/2013 | Kim | G06F 3/03545 | 345/156 |
| 2014/0015507 A1* | 1/2014 | Park | H04B 1/1607 | 323/304 |
| 2014/0028256 A1* | 1/2014 | Sugiyama | B60L 53/22 | 320/109 |
| 2014/0247547 A1* | 9/2014 | Jung | H02J 50/70 | 361/679.26 |
| 2014/0300312 A1* | 10/2014 | Akiyoshi | H02J 50/05 | 320/107 |
| 2015/0222139 A1* | 8/2015 | Petersen | A61M 60/178 | 320/108 |
| 2015/0372532 A1* | 12/2015 | Hatanaka | H02J 7/04 | 320/108 |
| 2016/0006292 A1* | 1/2016 | Hatanaka | H02J 7/0042 | 320/108 |
| 2016/0172882 A1* | 6/2016 | Hatanaka | H02J 50/12 | 320/108 |
| 2016/0241063 A1* | 8/2016 | Hatanaka | H04R 25/607 | |
| 2016/0241968 A1* | 8/2016 | Hatanaka | H02J 7/007182 | |
| 2021/0313837 A1* | 10/2021 | Hatanaka | H02J 7/0044 | |
| 2022/0115894 A1* | 4/2022 | Tsuda | H04R 25/30 | |

FOREIGN PATENT DOCUMENTS

| | | | | |
|---|---|---|---|---|
| EP | 0765104 | A2 | 3/1997 | |
| EP | 1432284 | A2 | 6/2004 | |
| EP | 1727395 | A2 * | 11/2006 | H02J 7/025 |
| EP | 1962557 | A2 | 8/2008 | |
| EP | 1973375 | A2 | 9/2008 | |
| EP | 1981253 | B1 | 6/2011 | |
| EP | 2397973 | A1 | 12/2011 | |
| JP | H05-049176 | A | 2/1993 | |
| JP | H05049176 | * | 2/1993 | H02J 7/025 |
| JP | H09-50795 | A | 2/1997 | |
| JP | H09-247930 | A | 9/1997 | |
| JP | 2002-534933 | A | 10/2002 | |
| JP | 2004-023975 | A | 1/2004 | |
| JP | 2004-537843 | A | 12/2004 | |
| JP | 2009-021910 | A | 1/2009 | |
| JP | 2010-034949 | A | 2/2010 | |
| JP | 2010-063243 | A | 3/2010 | |
| JP | 2011-055684 | A | 3/2011 | |
| JP | 2011-171871 | A | 9/2011 | |
| JP | 2012-257044 | A | 12/2012 | |
| JP | 2013-502116 | A | 1/2013 | |
| JP | 2013-084240 | A | 5/2013 | |
| KR | 20130035879 | A | 4/2013 | |
| WO | 2013/094469 | A1 | 6/2013 | |

OTHER PUBLICATIONS

JPH05049176 translation, Isaka Rechargeable electric (Year: 1993).*
Jul. 7, 2021 Office Action issued in European Patent Application No. 14838760.8.
Aug. 12, 2014 International Search Report issued in International Application No. PCT/JP2014/064335.
Feb. 17, 2016 Extended Search Report issued in European Patent Application No. 14838760.8.
Mar. 10, 2016 Office Action issued in Taiwanese Patent Application No. 103122730.
Apr. 4, 2016 Office Action issued in Korean Patent Application No. 10-2015-7004308.
Mar. 8, 2016 International Preliminary Report on Patentability issued in International Patent Application No. PCT/JP2014/064335.
Jul. 4, 2016 Office Action issued in Chinese Patent Application No. 201480002419.9.
Oct. 26, 2016 Office Action issued in Taiwanese Patent Application No. 103122730.
Mar. 24, 2017 Office Action issued in U.S. Appl. No. 14/422,233.
Jan. 24, 2017 Office Action issued in Korean Patent Application No. 10-2015-7004308.
Feb. 23, 2017 Office Action issued in Chinese Patent Application No. 201480002419.9.
May 22, 2017 Office Action issued in European Patent Application No. 14838760.8.
Jun. 27, 2017 Office Action issued in Chinese Patent Application No. 201480002419.9.
Aug. 8, 2017 Office Action issued in Japanese Patent Application No. 2014-083538.
Oct. 6, 2017 Office Action issued in U.S. Appl. No. 14/422,233.
Nov. 7, 2017 Office Action issued in Japanese Patent Application No. 2014-083538.
Apr. 5, 2018 Office Action Issued in U.S. Appl. No. 14/422,233.
Isaka, Rechargeable Electric Appliance, JP05049176 translation Feb. 1993.
Taguchi, electornic device power supply and program, JP2011117871 translation, Sep. 2011.
Apr. 24, 2018 Office Action issued in Japanese Patent Application No. 2014-083538.

(56) References Cited

OTHER PUBLICATIONS

Oct. 9, 2018 Notice of Allowance issued in U.S. Appl. No. 14/422,233.
May 30, 2019 U.S. Office Action issued U.S. Appl. No. 16/169,342.
Apr. 3, 2019 Notice of Opposition issued in European Patent Application No. 14838760.8.
Oct. 4, 2019 Summons to Attend Oral Proceedings issued in European Patent Application No. 14838760.8.
Feb. 20, 2020 U.S. Office Action issued U.S. Appl. No. 16/169,342.
Jun. 3, 2020 Summons issued in European Patent Application No. 14838760.8.
Oct. 1, 2020 Office Action Issued in U.S. Appl. No. 16/169,342.
Apr. 28, 2021 Notice of Allowance issued in U.S. Appl. No. 16/169,342.
Interlocutory Decision in Opposition Proceedings issued in European Patent Application No. 14838760.8 dated Mar. 4, 2021 (28 pages).

* cited by examiner

PORTABLE DEVICE, CHARGING SYSTEM, AND POWER SOURCE CIRCUIT SUBSTRATE

CROSS-REFERENCE

This is a Continuation of application Ser. No. 16/169,342 filed on Oct. 24, 2018, which is a continuation of application Ser. No. 14/422,233 filed on Feb. 18, 2015, which in turn is a National Phase Application of PCT/JP2014/064335 filed on May 29, 2014, which claims the benefit of JP2014-083538 filed on Apr. 15, 2014, JP2013-218842 filed on Oct. 22, 2013, and JP2013-183130 filed on Sep. 4, 2013. The disclosures of the prior applications are hereby incorporated by reference herein in their entireties.

TECHNICAL FIELD

The present invention relates to a portable device, a charging system, and a power source circuit substrate, which have a function of not allowing a driving component to operate when a secondary battery is being charged.

BACKGROUND

In known arrangements, in order to prevent a driving component (which is driven by power of a secondary battery) from operating while the secondary battery is being charged (to prevent unnecessary discharge and malfunction), a manual on-off mechanism employing a pushbutton (e.g., PTL 1) or an automatic on-off mechanism employing a mechanical contact (e.g., PTL 2) has been used to stop the operation of the driving component during the charging.

When the mechanism above is employed, another action is required in addition to the charging operation, in order to stop the operation of the driving component during the charging. This is not disadvantageous when, for example, the driving component is a mobile phone, because the mobile phone is required to perform its function even during the charging.

CITATION LIST

Patent Literatures

[PTL 1] Japanese Unexamined Patent Publication No. 2013-84240
[PTL 2] Japanese Unexamined Patent Publication No. 09-50795

SUMMARY OF INVENTION

Technical Problem

However, in accordance with the use of the driving component, the driving component may not be required to operate during the charging, or the driving component is required not to operate during the charging. For example, in case of hearing aids, a user typically attaches the hearing aids to one's ears' when getting up, and removes and charges the hearing aids when going to bed. In other words, the hearing aids are not required to operate during the charging. Under these circumstances, it is tiresome to take an action in addition to the charging operation in order to stop the operation of the driving component during the charging.

An object of the present invention is therefore to provide a portable device, a charging system, and a power source circuit substrate, in which the handling in activating a function of stopping the operation of a driving component during the charging is improved as the prohibition of the operation of the driving component during the charging and the allowance of the operation of the driving component upon the end of the charging are automatically switched in accordance with whether there is power supply from the outside.

Solution to Problem

According to an aspect of the invention for solving the problem above, a portable device includes: a secondary battery; a driving component driven by charged power of the secondary battery; a charging unit configured to charge the secondary battery by an input of outside power supplied from outside; a transformation unit configured to output the charged power of the secondary battery at a driving voltage of the driving component; a detection unit configured to detect the input of the outside power to the charging unit; and a switching controller configured to switch a state of the transformation unit from an operation state to a stopped state only when the input of the outside power to the charging unit is detected by the detection unit.

In a known portable device having a function of stopping the charging and the operation by which a driving component is not driven during the charging of a secondary battery, a manual on-off mechanism employing a push button or an automatic on-off mechanism employing a mechanical contact has been used to stop the operation of the driving component during the charging. According to the arrangement above, the function of stopping the charging and the operation is realized without using a manual on-off mechanism employing a pushbutton or an automatic on-off mechanism employing a mechanical contact. That is to say, the prohibition of the operation of the driving component during the charging and the allowance of the operation of the driving component upon the end of the charging are automatically switched in accordance with whether there is power supply from the outside. This improves the handling of the portable device when the function of stopping the charging and the operation is performed, and the downsizing and the manufacture of the portable device become easy because a manual on-off mechanism or an automatic on-off mechanism using a mechanical contact is unnecessary.

The portable device of the present invention may further include at least one driving component identical with the driving component and at least one transformation unit identical with the transformation unit, the transformation units outputting driving voltages corresponding to the respective driving components, the switching controller switching a state of a particular transformation unit which is at least one of the transformation units from the operation state to the stopped state.

According to this arrangement, because a particular driving component stopped during the charging and a driving component driven during the charging are differentiated based on whether there is power supply from the outside, it is possible to perform the charging with minimum power consumption while maintaining a desired function.

The portable device of the present invention may further include a hearing aid function component as one of the driving components, a transformation unit which outputs the charged power of the secondary battery to the hearing aid function component being the particular transformation unit.

According to this arrangement, the charging is performed with minimum power consumption while the operation of a desired function is maintained, because the operation of a hearing aid function component which is unlikely to be used is stopped during the charging.

According to another aspect of the invention for solving the problem above, the portable device may be arranged such that the charging unit, the transformation units, the detection unit, and the switching controller constitute an integrated circuit substrate.

According to this arrangement, the portable device is further downsized because the charging unit, the transformation units, the detection unit, and the switching controller are integrated into one chip as an integrated circuit substrate.

According to another aspect of the invention for solving the problem above, the portable device may further include a power-receiving module which is configured to receive power from the outside in a contactless manner and to output the received power to the charging unit as the outside power.

This arrangement improves the handling of the portable device when the secondary battery is charged, by performing power supply in a contactless manner.

According to another aspect of the invention for solving the problem above, the portable device may further include a power-receiving module which is configured to receive power from the outside by a resonance phenomenon and to output the received power to the charging unit as the outside power, the charging unit, the transformation units, the detection unit, and the switching controller constituting an integrated circuit substrate, and the integrated circuit substrate being provided in a magnetic field space which is formed by the resonance phenomenon to have a lower magnetic field strength than other parts.

With this arrangement, contactless power supply is possible, and the freedom of design in charging the secondary battery of the portable device is improved because the power supply by the resonance phenomenon with which the distance of power supply is increased as compared to the electromagnetic induction is employed. Furthermore, the portable device is further downsized because the charging unit, the transformation units, the detection unit, and the switching controller are integrated into one chip as an integrated circuit substrate. Furthermore, because the power-receiving module to which power is supplied by the resonance phenomenon is provided in the portable device, a space part having a small magnetic field is generated at around the power-receiving module, and this space part is effectively used as the arrangement location of the power source circuit substrate. With this, even in the portable device in which it is difficult to secure an arrangement place of a component, the arrangement place of the power source circuit substrate is easily secured and hence the downsizing of the portable device is realized.

According to another aspect of the invention for solving the problem above, a charging system includes the above-described portable device and a power-supplying module configured to supply power to the power-receiving module by the resonance phenomenon.

With the arrangement above, because the portable device is arranged to be close to the charger to the extent that the resonance phenomenon between the power-receiving module of the portable device and the power-supplying module of the charger occurs, the secondary battery of the ear-portable device is charged in a contactless manner. During this charging, the operation of each driving component in the portable device is automatically prohibited without requiring an operation of push button or the like. To put it differently, with the arrangement above, the charging of the secondary battery is performed while the operation of the driving component is automatically prohibited, only by mounting the portable device on the charger, and the charging of the secondary battery is stopped while the operation of the driving component is automatically allowed, only by detaching the portable device from the charger. As such, the charging and the stop of the charging of the secondary battery in sync with the operation of the driving component are easily switched by a simple operation such as attaching or mounting the portable device to the charger.

A charging system of the present invention may be arranged such that the portable device includes, as one of the driving components, a communication function component configured to sent state data indicating a state of the portable device, and the charger includes: a communication unit which enables wireless communication with the communication function component when the power-supplying module supplies the power to the power-receiving module; and a display unit configured to display charging information based on the state data received by the communication unit.

With this arrangement, the charging system is able to display, on the display unit of the charger, charging information such as a charge amount and a temperature of the secondary battery of the portable device by wireless communication while reducing the power consumption by stopping a particular driving component during the charging. In this way, the charging system allows the user to easily recognize the timing of the completion of the charging.

According to another aspect of the invention for solving the problem above, a power source circuit substrate includes: a charging unit configured to charge a secondary battery by an input of outside power from outside; a transformation unit configured to output charged power of the secondary battery at a driving voltage of the driving component; a detection unit configured to detect the input of the outside power to the charging unit; and a switching controller configured to switch a state of the transformation unit from an operation state to a stopped state only when the input of the outside power to the charging unit is detected by the detection unit.

In known devices having a function of stopping the charging and the operation by which a driving component is not driven during the charging of a secondary battery, a manual on-off mechanism employing a push button or an automatic on-off mechanism employing a mechanical contact has been used to realize the function of stopping the charging and the operation. According to the arrangement above, the function of stopping the charging and the operation is realized in all types of devices with different shapes simply by mounting the power source circuit substrate on each device. This makes it possible to downsize the device and makes it easy to manufacture the device, because the manual or automatic on-off mechanism is unnecessary.

The power source circuit substrate of the present invention may include at least one transformation unit identical with the transformation unit, the switching controller switching a state of a particular transformation unit which is at least one of the transformation units from the operation state to the stopped state.

According to this arrangement, because a particular driving component stopped during the charging and a driving component driven during the charging are differentiated based on whether there is power supply from the outside, it is possible to perform the charging with minimum power consumption while maintaining a desired function.

According to another aspect of the invention for solving the problem above, the power source circuit substrate may be formed as an integrated circuit substrate.

According to this arrangement, because the power source circuit substrate is embodied in one chip as an integrated circuit substrate, a device such as a portable device on which the power source circuit substrate is mounted is further downsized.

According to another aspect of the invention for solving the problem above, a body mount device include the power source circuit substrate.

This arrangement makes it easy to handle the body mount device and downsizes the body mount device.

According to another aspect of the invention for solving the problem above, hearing aids include the power source circuit substrate.

This arrangement makes it easy to handle the hearing aids and downsizes the hearing aids.

Another aspect of the invention for solving the problem above discloses a power-supplying method for supplying power to a secondary battery of a portable device, the portable device including: the secondary battery; a driving component driven by charged power of the secondary battery; a charging unit configured to charge the secondary battery by an input of outside power from outside in a contactless manner; a transformation unit configured to output the charged power of the secondary battery at a driving voltage of the driving component; and a detection unit configured to detect the input of the charging unit to the outside power, a state of the transformation unit being switched from an operation state to a stopped state when the input of the outside power to the charging unit is detected by the detection unit.

According to the method above, when the secondary battery is charged by the input of outside power in a contactless manner, the state of the transformation unit is switched from the operation state to the stopped state when the detection unit detects the input of the outside power to the charging unit. This makes it possible to prohibit the operation of the driving component when the secondary battery is charged, and hence the handling of the portable device when the function of stopping the driving component during the charging is performed is improved.

The power-supplying method of the present invention may be arranged such that the portable device further includes at least one driving component identical with the driving component and at least one transformation unit identical with the transformation unit, the transformation units outputting driving voltages corresponding to the respective driving components, a state of a particular transformation unit which is at least one of the transformation units is switched from the operation state to the stopped state when the input of the outside power to the charging unit is detected by the detection unit.

According to this arrangement, because a particular driving component stopped during the charging and a driving component driven during the charging are differentiated based on whether there is power supply from the outside, it is possible to perform the charging with minimum power consumption while maintaining a desired function.

According to another aspect of the invention for solving the problem above, a power source circuit substrate includes: a charging unit configured to charge a secondary battery by an input of outside power from outside; a processing unit driven by charged power of the secondary battery; and a switching controller configured to switch a state of the processing unit from an operation state to a stopped state only when the secondary battery is charged by the charging unit.

According to the arrangement above, the function of stopping the charging and the operation is realized without using a manual on-off mechanism employing a push button or an automatic on-off mechanism employing a mechanical contact. That is to say, the prohibition of the operation of the driving component during the charging and the allowance of the operation of the driving component upon the end of the charging are automatically switched in accordance with whether there is power supply from the outside. With this, the power source circuit substrate improves the handling of the portable device when the function of stopping the charging and the operation is performed, and the downsizing and the manufacture of the portable device become easy because a manual on-off mechanism or an automatic on-off mechanism using a mechanical contact is unnecessary.

According to another aspect of the invention for solving the problem above, a portable device includes: a secondary battery; a driving component driven by charged power of the secondary battery; a charging unit configured to charge the secondary battery by an input of outside power from outside; and a switching controller configured to switch a state of the driving component from an operation state to a stopped state only when the secondary battery is charged by the charging unit.

According to the arrangement above, the function of stopping the charging and the operation is realized without using a manual on-off mechanism employing a pushbutton or an automatic on-off mechanism employing a mechanical contact. That is to say, the prohibition of the operation of the driving component during the charging and the allowance of the operation of the driving component upon the end of the charging are automatically switched in accordance with whether there is power supply from the outside. This improves the handling of the portable device when the function of stopping the charging and the operation is performed, and the downsizing and the manufacture of the portable device become easy because a manual on-off mechanism or an automatic on-off mechanism using a mechanical contact is unnecessary.

Advantageous Effects of Invention

The present invention provides a portable device, a charging system, and a power source circuit substrate, in which the handling in activating a function of stopping the operation of a driving component during the charging is improved as the prohibition of the operation of the driving component during the charging and the allowance of the operation of the driving component upon the end of the charging are automatically switched in accordance with whether there is power supply from the outside.

DESCRIPTION OF EMBODIMENTS

Embodiment 1

(Structure of Power Source Circuit Substrate 1)

Figure 2:
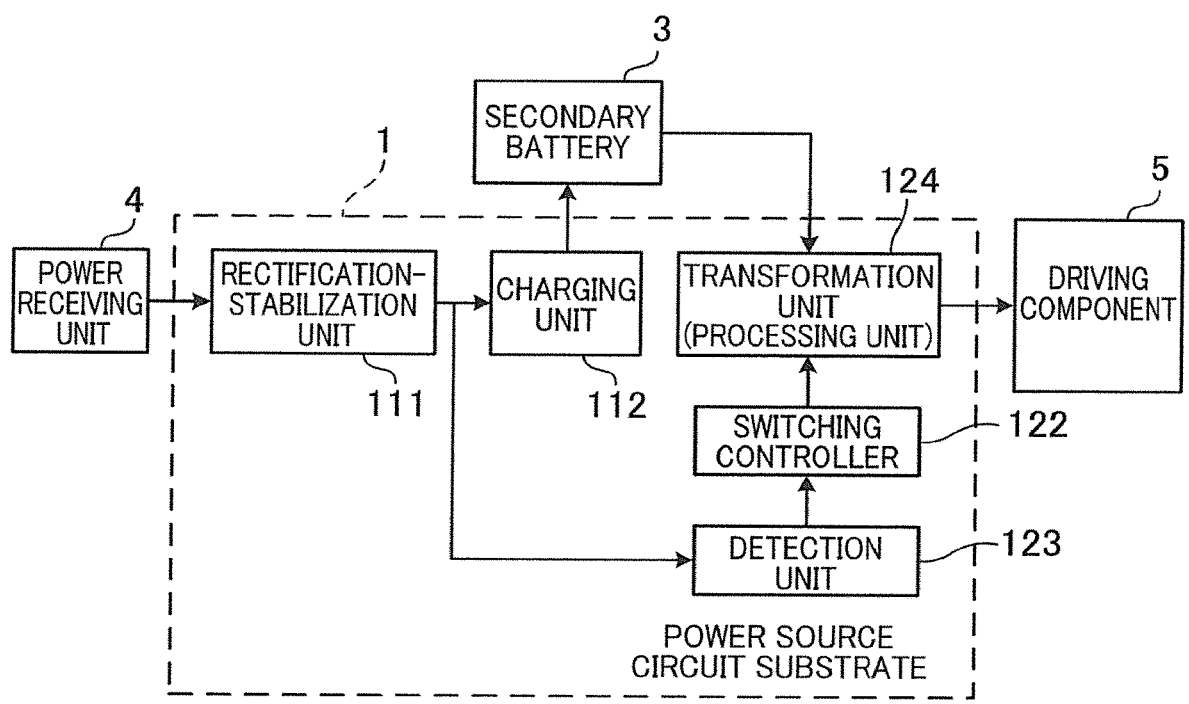
FIG. 2 is a detailed block diagram of a power source circuit substrate.

To begin with, a power source circuit substrate 1 of Embodiment 1 will be described. As shown in FIG. 2, the power source circuit substrate 1 includes a rectification-stabilization unit 111 configured to output DC power by rectifying AC power supplied from the outside via a power receiving unit 4 from which the AC power is output, a charging unit 112 configured to supply, at a charging voltage, the DC power output from the rectification-stabilization unit 111 to a secondary battery 3 which is chargeable and dischargeable, a transformation unit (processing unit) 124 configured to perform signal processing, a detection unit 123 configured to detect the input of the power to the charging unit 112, and a switching controller 122 configured to switch the transformation unit (processing unit) 124 from an operation state to a stopped state only when the detection unit 123 detects the input of the power to the charging unit 112. The power source circuit substrate 1 is connected to a driving component 5 which is driven by the power charged in the secondary battery 3.

The power receiving unit 4 employs either wired power supply or wireless power supply. Examples of the wireless power supply include electromagnetic induction and electromagnetic field resonance.

As the secondary battery 3, any type of batteries which are chargeable and rechargeable can be used. Examples of the secondary battery 3 include a lead storage battery, a valve-regulated lead storage battery, a lithium air battery, a lithium ion battery, a lithium ion polymer battery, a lithium iron phosphate ion battery, a lithium-sulfur battery, a lithium titanate battery, a nickel-cadmium storage battery, a nickel-hydrogen rechargeable battery, a nickel-iron battery, a nickel-lithium battery, a nickel-zinc battery, a rechargeable alkali battery, a sodium-sulfur battery, a redox flow battery, a zinc-bromine flow battery, and a silicon battery.

Figure 3:
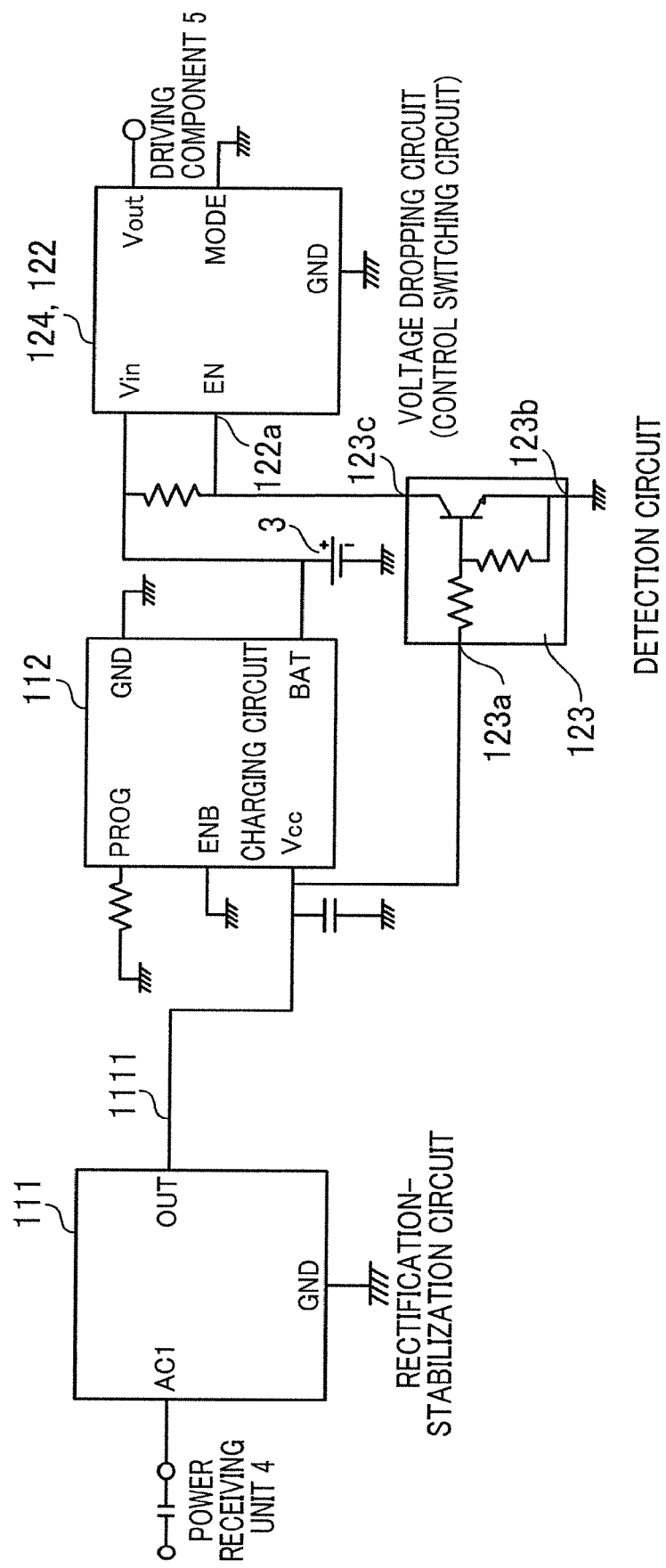
FIG. 3 is a circuit block diagram of the power source circuit substrate.

To specifically describe the rectification-stabilization unit 111, as shown in FIG. 3, a rectification-stabilization IC may be used as this unit 111. The rectification-stabilization IC is an IC in which functions such as full bridge synchronous rectification, voltage conditioning and wireless power control, and protection from a voltage, current, or temperature anomaly are integrated into one chip. When the power output from the power receiving unit 4 is DC power, the rectification-stabilization unit 111 is omitted.

As shown in FIG. 3, the charging unit 112 is an IC (charging circuit) for a constant current/constant voltage linear charger, and has functions such as a function of notifying that the charging current has been reduced to a predetermined setting value, a function of ending the charging using a timer, a function of stabilizing the charging current by means of thermal feedback, and a function of limiting the chip temperature in a high-power mode or in high ambient temperatures.

The transformation unit (processing unit) 124 is a transformation circuit which functions as a transformation unit performing signal processing of converting the charged power of the secondary battery 3 to the driving power of the driving component 5 and outputting the converted power. As the transformation unit (processing unit) 124, as shown in FIG. 3, a linear regulator may be employed for voltage dropping, or a switching regulator may be employed for voltage boosting and voltage dropping. Each of these regulators may be embodied by rapidly turning one and off a current by a semiconductor device. While in Embodiment 1 the transformation unit 124 is employed as the processing unit, the processing unit may be differently arranged on condition that the signal processing is performed.

The detection unit 123 is a detection circuit configured to output a detection signal which indicates that DC power is output from the rectification-stabilization unit 111 to the charging unit 112. The detection unit 123 may be formed by an analog circuit such as a transistor. To be more specific, as shown in FIG. 3, the detection unit 123 connects a base terminal 123a of a NPN transistor to an output power line 1111 between the rectification-stabilization unit 111 and the charging unit 112, and connects an emitter terminal 123b to the ground. Furthermore, as a collector terminal 123c is connected to the positive side of the secondary battery 3 via a resistor, a high impedance state is achieved, and connection to the collector terminal 123c to an input terminal 122a of the switching controller 122 is achieved.

As a result, when the rectification-stabilization unit 111 does not output DC power, the base terminal 123a of the detection unit 123 is in the low level and the emitter terminal 123b and the collector terminal 123c are not electrically connected with each other, with the result that a high-level detection signal is input to the input terminal 122a of the switching controller 122. In the meanwhile, when DC power is supplied from the rectification-stabilization unit 111 to the charging unit 112 via the output power line 1111, the base terminal 123a is in the high level, and hence the collector terminal 123c and the emitter terminal 123b are electrically connected with each other and the signal at the collector terminal 123c is changed to a low-level detection signal at a ground potential. As a result, when the DC power is output from the rectification-stabilization unit 111 to the charging unit 112, the low-level detection signal is input to the input terminal 122a of the switching controller 122. The detection unit 123 may be formed by a digital circuit.

The switching controller 122 is a switching control circuit which sets the transformation unit (processing unit) 124 to the stopped state when the low-level detection signal is input from the detection unit 123, and sets the transformation unit (processing unit) 124 to the operation state when the high-level detection signal is input (i.e., when the low-level detection signal is not input). While in Embodiment 1 the low-level detection signal is used as a condition of stopping the transformation unit (processing unit) 124 and the high-level detection signal is used as a condition of operating the transformation unit (processing unit) 124, the disclosure is not limited to this arrangement and the low-level detection signal may be used as a condition of activating the transformation unit (processing unit) 124 and the high-level detection signal may be used as a condition of stopping the transformation unit (processing unit) 124.

The driving component 5 is driven by the charged power of the secondary battery 3 when the transformation unit (processing unit) 124 is in the operation state. Examples of the driving component 5 include all kinds of devices driven by electric power, such as a motor, a speaker, a light emitting member, a display member, and a micro computer.

As such, the power source circuit substrate 1 is formed as an integrated circuit substrate by which the prohibition of the operation of the driving component 5 during the charging of the secondary battery 3 and the allowance of the operation of the driving component 5 upon the end of the charging are automatically switched in accordance with whether there is power supply from the outside to the secondary battery 3, and hence the power source circuit substrate 1 is formed in high density and by a simple circuit configuration. The power source circuit substrate 1 may be employed in transportation machines such as cars (including EV), motorbikes, and an airplanes, or may be employed in a later-described portable device.

(Portable Device 6: Application Example of Power Source Circuit Substrate 1)

Now, the following will specifically describe a case where the power source circuit substrate 1 arranged as above is employed in a portable device 6.

Figure 4:
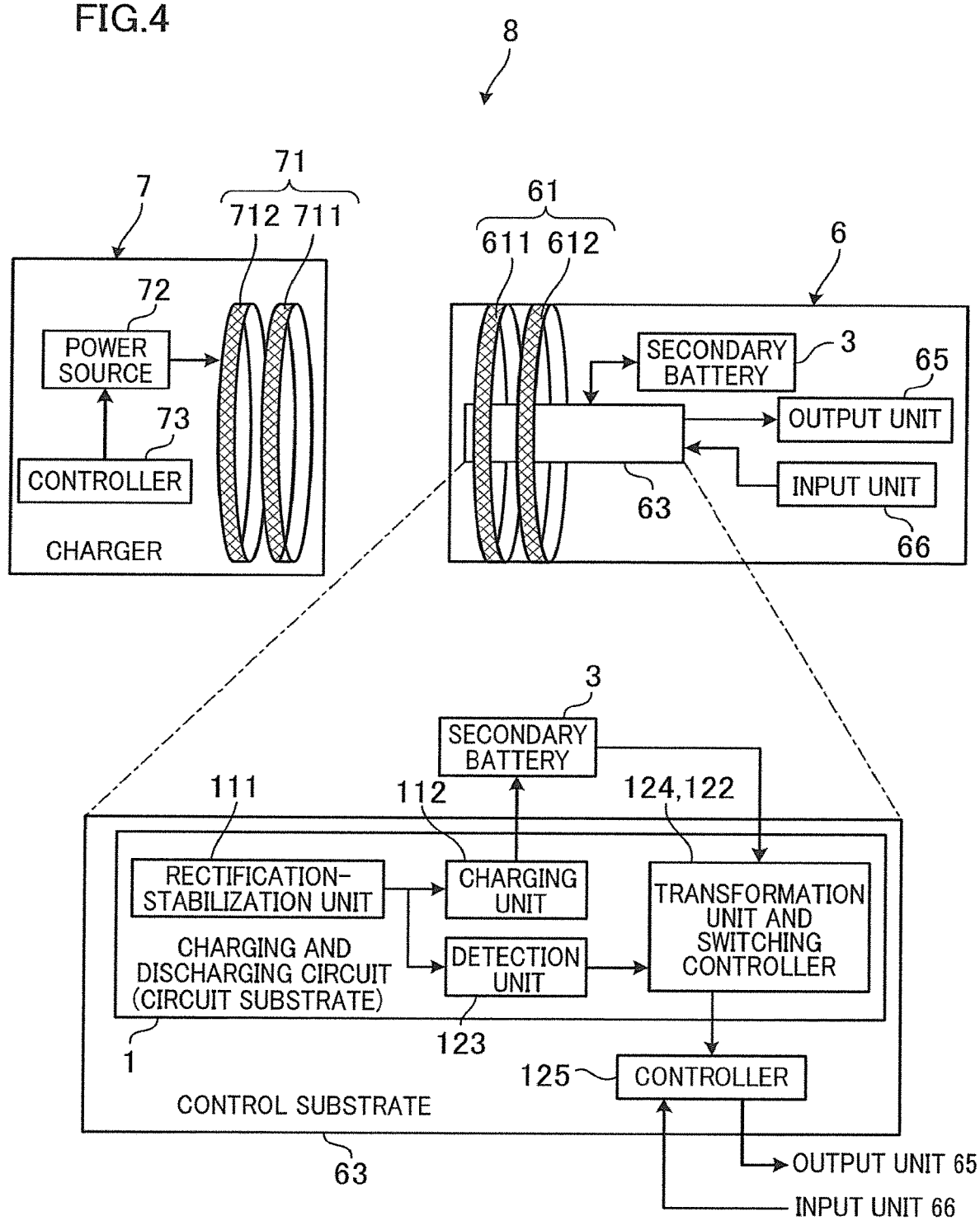
FIG. 4 is a block diagram of a charging system.

As shown in FIG. 4, the portable device 6 includes a power-receiving module 61 (power receiving unit 4) to which power is supplied from the outside by a resonance phenomenon, a secondary battery 3 which is chargeable and dischargeable, a control substrate 63 in which the above-described power source circuit substrate 1 and a controller 125 are mounted, an output unit 65 (driving component 5) such as a speaker, a a light emitting member, and a display member, and an input unit 66 (driving component 5) such as a microphone and a switch. The resonance phenomenon indicates that two or more coils are resonated at a resonance frequency. The portable device 6 arranged in this manner is charged by a charger 7.

The charger 7 includes a power-supplying module 71 which supplies power to the power-receiving module 61 of the portable device 6 by the resonance phenomenon. The portable device 6 and the charger 7 constitute a charging system 8 which is configured to supply power (by wireless power transmission) from the power-supplying module 71 to the power-receiving module 61 by the resonance phenomenon.

The control substrate 63 includes the power source circuit substrate 1 and the controller 125 and is connected to the output unit 65 and the input unit 66. The controller 125 has a function of outputting a control signal to the output unit 65, a function of receiving an input signal from the input unit 66, and a function of processing different kinds of information and data corresponding to the use of the driving component 5 of the portable device 6.

The control substrate 63 including the power source circuit substrate 1 and the controller 125 is provided in a magnetic field space which is formed by the resonance phenomenon to have a lower magnetic field strength than other parts. To put it differently, the portable device 6 generates a space part having a small magnetic field at or around the inner side of the power-receiving module 61 when power supply using the resonance phenomenon is carried out, and this space part is used as an arrangement place of the control substrate 63. The portable device 6 can therefore be downsized because malfunction and generation of heat equal to or higher than a predetermined temperature are prevented as the generation of an Eddy current by a magnetic field at the control substrate 63 provided in the space part is restrained. Details of the space part having a low magnetic field strength will be given later. In addition to the control substrate 63, the secondary battery 3, the output unit 65, and the input unit 66 may also be provided in the space part (magnetic field space).

The power-receiving module 61 includes a power-receiving resonance coil 611 and a power-taking coil 612. Examples of the types of coils used as the power-receiving resonance coil 611 and the power-taking coil 612 include a spiral type, a solenoid type, and a loop type.

The portable device 6 of Embodiment 1 include both a handheld device (which can be carried by a hand) and a wearable device (which can be attached to a human body: a body mount device). Specific examples of the portable device include a portable computer (a laptop PC, a note PC, a tablet PC, or the like), a camera, an audio visual device (a mobile music player, an IC recorder, a portable DVD player, or the like), a calculator (such as a pocket computer and an electronic calculator), a game console, a computer peripheral (a portable printer, a portable scanner, a portable modem, or the like), a dedicated information device (an electronic dictionary, an electronic notebook, an electronic book, a portable data terminal, or the like), a mobile communication terminal, a voice communication terminal (a mobile phone, a PHS, a satellite phone, a third party radio system, an amateur radio, a specified low power radio, a personal radio, a citizen radio, or the like), a data communication terminal (a mobile phone, a PHS (a feature phone and a smart phone), a pager, or the like), a broadcasting receiver (a television receiver and a radio), a portable radio, a portable television receiver, a 1 seg receiver, another type of device (a wristwatch and a pocket watch), a hearing aid, a handheld GPS, a security buzzer, a flashlight/pen light, and a battery pack. Examples of the hearing aids include ear-hook hearing aids, ear-hole hearing aids, and glasses-like hearing aids.

(Charger 7)

The charger 7 which is configured to charge the portable device 6 arranged as above includes a charging stand on which the portable device 6 can be mounted. The charger 7 further includes a power-supplying module 71 configured to supply power by the resonance phenomenon to the portable device 6 mounted on the charging stand. The power-supplying module 71 includes a power-supplying resonance coil 711 and a power supply coil 712. Examples of the types of coils used as the power-supplying resonance coil 711 and the power supply coil 712 include a spiral type, a solenoid type, and a loop type. The charger 7 further includes a power source unit 72 configured to supply AC power to the power-supplying module 71 and a controller 73 configured to control the power source unit 72.

As the portable device 6 is mounted on the charging stand of this charger 7, the power-supplying module 71 of the charger 7 and the power-receiving module 61 of the portable device 6 oppose each other. By simply mounting the portable device 6 on the charging stand of the charger 7, the charging to the secondary battery 3 starts and the power supply from the secondary battery 3 of the portable device 6 to the driving components 5 such as the output unit 65 and the input unit 66 is turned off. In the meanwhile, by simply lifting up the portable device 6 from the charging stand of the charger 7, the charging to the secondary battery 3 is stopped and the power supply from the secondary battery 3 of the portable device 6 to the driving components 5 such as the output unit 65 and the input unit 66 is turned on.

In a manner similar to the portable device 6, the charger 7 may be arranged such that a space part having a small magnetic field is generated at or around the inner side of the power-supplying module 71 at the time of power supply by the resonance phenomenon, and this space part is used as an arrangement place of the power source unit 72 and the controller 73. This arrangement makes it possible to downsize the charger 7 in addition to the portable device 6.

(Space Part Having Small Magnetic Field)

Now, the space part having a small magnetic field, which is mainly used as a place where the control substrate 63 of the portable device 6 is provided, will be detailed.

The portable device 6 is arranged such that a space part having a small magnetic field is formed at a desired position. The formation of the space part at the desired position is achieved by suitably setting power supply conditions such as a positional relation with the charger 7, a power-supplying state, and an internal structure.

For example, the portable device 6 may be arranged such that, when power is supplied by the resonance phenomenon from the power-supplying resonance coil 711 of the power-supplying module 71 of the charger 7 to the power-receiving resonance coil 611 of the power-receiving module 61, at a desired position between the power-supplying resonance coil 711 of the power-supplying module 71 and the power-receiving resonance coil 611 of the power-receiving module 61, a magnetic field space having a magnetic field strength lower than the magnetic field strengths in parts other than the desired position is formed as a space part. Because in this case the space part is generated at around the charger 7 side of the power-receiving module 61, the leading end portion side of the outer wall member is secured as the arrangement place of the control substrate 63 as the power-receiving module 61 is disposed to be slightly closer to the rear side than the leading end portion on the charger 7 side of the outer wall member.

An example of a method of forming the space part will be detailed. When power is supplied by the resonance phenomenon from the power-supplying resonance coil 711 of the power-supplying module 71 of the charger 7 to the power-receiving resonance coil 611 of the power-receiving module 61 of the portable device 6, the frequency of the power supplied to the power-supplying resonance coil 711 of the power-supplying module 71 is arranged so that the direction of a current flowing in the power-supplying resonance coil 711 of the power-supplying module 71 is opposite to the direction of a current flowing in the power-receiving resonance coil 611 of the power-receiving module 61.

In the formation method above, when power transmission using the resonance phenomenon is performed, the coupling coefficient indicating the strength of the coupling between the power-supplying resonance coil 711 and the power-receiving resonance coil 611 is increased as the power-supplying resonance coil 711 of the power-supplying module 71 and the power-receiving resonance coil 611 of the power-receiving module 61 are disposed to be close to each other. When the coupling coefficient is high in this manner, the measurement of a transmission characteristic "S21" (which is a value used as an index of power transmission efficiency when power is supplied from the power-supplying resonance coil 711 to the power-receiving resonance coil 611) shows that a measured waveform has two separated peaks on the low frequency side and the high frequency side, respectively. As the frequency of the power supplied to the power-supplying resonance coil 711 is set at a frequency around the peak on the high frequency side, the direction of the current flowing in the power-supplying resonance coil 711 is arranged to be opposite to the direction of the current flowing in the power-receiving resonance coil 611, and hence the magnetic field generated on the inner circumference side of the power-supplying resonance coil 711 and the magnetic field generated on the inner circumference side of the power-receiving resonance coil 611 cancel each other out, with the result that an influence of the magnetic field is reduced on the inner circumference sides of the power-supplying resonance coil 711 and the power-receiving resonance coil 611. With this, a magnetic field space having a magnetic field strength lower than the magnetic field strengths in parts other than the inner circumference sides of the power-supplying resonance coil 711 and the power-receiving resonance coil 611 is formed as a space part.

In another method of forming a space part, for example, when power is supplied from the power-supplying resonance coil 711 to the power-receiving resonance coil 611 by the resonance phenomenon, the frequency of the power supplied to the power-supplying resonance coil 711 is set so that the direction of the current flowing in the power-supplying resonance coil 711 is identical with the direction of the current flowing in the power-receiving resonance coil 611.

According to the method above, when power transmission using the resonance phenomenon is performed, the coupling coefficient indicating the strength of the coupling between the power-supplying resonance coil 711 and the power-receiving resonance coil 611 is increased as the power-supplying resonance coil 711 and the power-receiving resonance coil 611 are disposed to be close to each other. When the coupling coefficient is high in this manner, the measurement of the transmission characteristic shows that a measured waveform has two separated peaks on the low frequency side and the high frequency side, respectively. As the frequency of the power supplied to the power-supplying resonance coil 711 is set at a frequency around the peak on the low frequency side, the direction of the current flowing in the power-supplying resonance coil 711 is arranged to be identical with the direction of the current flowing in the power-receiving resonance coil 611, and hence the magnetic field generated on the outer circumference side of the power-supplying resonance coil 711 and the magnetic field generated on the outer circumference side of the power-receiving resonance coil 611 cancel each other out, with the result that an influence of the magnetic field is reduced on the outer circumference sides of the power-supplying resonance coil 711 and the power-receiving resonance coil 611. With this, a magnetic field space having a magnetic field strength lower than the magnetic field strengths in parts other than the outer circumference sides of the power-supplying resonance coil 711 and the power-receiving resonance coil 611 is formed as a space part.

In addition to the above, the size of the space part may be set based on the strength of the magnetic coupling between the power-supplying resonance coil 711 and the power-receiving resonance coil 611, by changing adjustment parameters regarding the power-supplying resonance coil 711 and the power-receiving resonance coil 611. For example, the size of the magnetic field space is increased by relatively weakening the magnetic coupling between the power-supplying resonance coil 711 and the power-receiving resonance coil 611. In the meanwhile, the size of the magnetic field space is decreased by relatively strengthening the magnetic coupling between the power-supplying resonance coil 711 and the power-receiving resonance coil 611. As such, a space part optimum for the size of the portable device 6 is formed.

Alternatively, the size of the magnetic field space may be changed in such a way that the arrangement relation of the power-supplying resonance coil 711 and the arrangement relation of the power-receiving resonance coil 611 are used as the adjustment parameters, and the adjustment parameters are changed to change the strength of the magnetic coupling between the power-supplying resonance coil 711 and the power-receiving resonance coil 611.

Furthermore, the shape of the space part space may be arranged to be a desired shape in such a way that the shapes of the power-supplying resonance coil 711 and the power-receiving resonance coil 611 are used as the adjustment parameters, and the shapes of these coils are changed in a desirable manner to change the strength of the magnetic coupling between and around the power-supplying resonance coil 711 and the power-receiving resonance coil 611. In this case, as the power-supplying resonance coil 711 and the power-receiving resonance coil 611 are arranged to have desired shapes, a magnetic field space having a relatively low magnetic field strength is formed with a desired shape corresponding to the shapes of the coils.

In addition to the above, the size of the space part may be set in such a way that at least one of the first distance between the power-supplying resonance coil 711 and the power supply coil 712 and the second distance between the power-taking coil 612 and the power-receiving resonance coil 611 is used as an adjustment parameter, and the size is set based on this adjustment parameter. For example, the size of the magnetic field space is increased in such a way that the first distance between the power-supplying resonance coil 711 and the power supply coil 712 and the second distance between the power-taking coil 612 and the power-receiving resonance coil 611 are relatively shortened so that the magnetic coupling is relatively weakened. In the meanwhile, the size of the magnetic field space is decreased in such a way that the first distance between the power-supplying resonance coil 711 and the power supply coil 712 and the second distance between the power-taking coil 612 and the power-receiving resonance coil 611 are relatively elongated so that the magnetic coupling is relatively strengthened.

In addition to the above, as a space part, a magnetic field space may be formed at a desired position with a magnetic field strength lower than the magnetic field strengths in parts other than the desired position, in such a manner that, a magnetic member is provided to cover at least a part of the power-receiving resonance coil 611 and the power-supplying resonance coil 711 except the surfaces where these coils oppose each other, and power transmission is carried out by changing the magnetic field between the power-supplying resonance coil 711 and the power-receiving resonance coil 611. The magnetic member may be provided to cover the inner circumferential surface of the power-receiving resonance coil 611. In this case, by blocking the magnetic field generated on the inner circumference side of the power-receiving resonance coil 611, a magnetic field space having a relatively low magnetic field strength is formed as a space part on the inner circumference side of the power-receiving resonance coil 611.

In addition to the above, the magnetic member may be provided to cover the surfaces of the power-supplying resonance coil 711 and the power-receiving resonance coil 611, which surfaces are opposite to the surfaces where the coils oppose each other. In this case, by blocking the magnetic field generated at around the surface opposite to the opposing surface of the power-receiving resonance coil 611, a magnetic field space having a relatively low magnetic field strength is formed as a space part at around the surface opposite to the opposing surface of the power-receiving resonance coil 611.

As such, the portable device 6 is arranged such that, based on a combination of at least one of the above-described methods of forming the space part, a magnetic field space having a low magnetic field strength can be intentionally formed at will as a space part at and around the inner side of the power-receiving module 61, and the size and shape of the space part can be arbitrarily set. To put it differently, in the portable device 6, a desired space part is formed by adjusting the way of disposing the power-receiving module 61.

(Hearing Aids)

Now, the following will detail a case where the portable device 6 arranged as above is employed in hearing aids which constitute a body mount device. While in Embodiment 1 ear-hook hearing aids 9 are taken as an example of the hearing aids, the disclosure is not limited to the same. Examples of the hearing aids include pocket-type (box-shaped) hearing aids, ear-hook hearing aids (BTE), ear-hole hearing aids (ITE), canal-type hearing aids (ITC), CIC-type hearing aids (CIC), open-ear hearing aids, RIC-type hearing aids (RIC), bone-conduction hearing aids, and embedded hearing aids. Examples of the body mount device include a device mounted on an ear such as the hearing aids and a music player, a face-mounted device such as eyewear (e.g., glasses) with a portable computer, a wrist-mounted device such as a wristwatch, and medical equipment embedded in a human body.

(Hearing Aids: Ear-Hook Hearing Aids 9)

Figure 5:
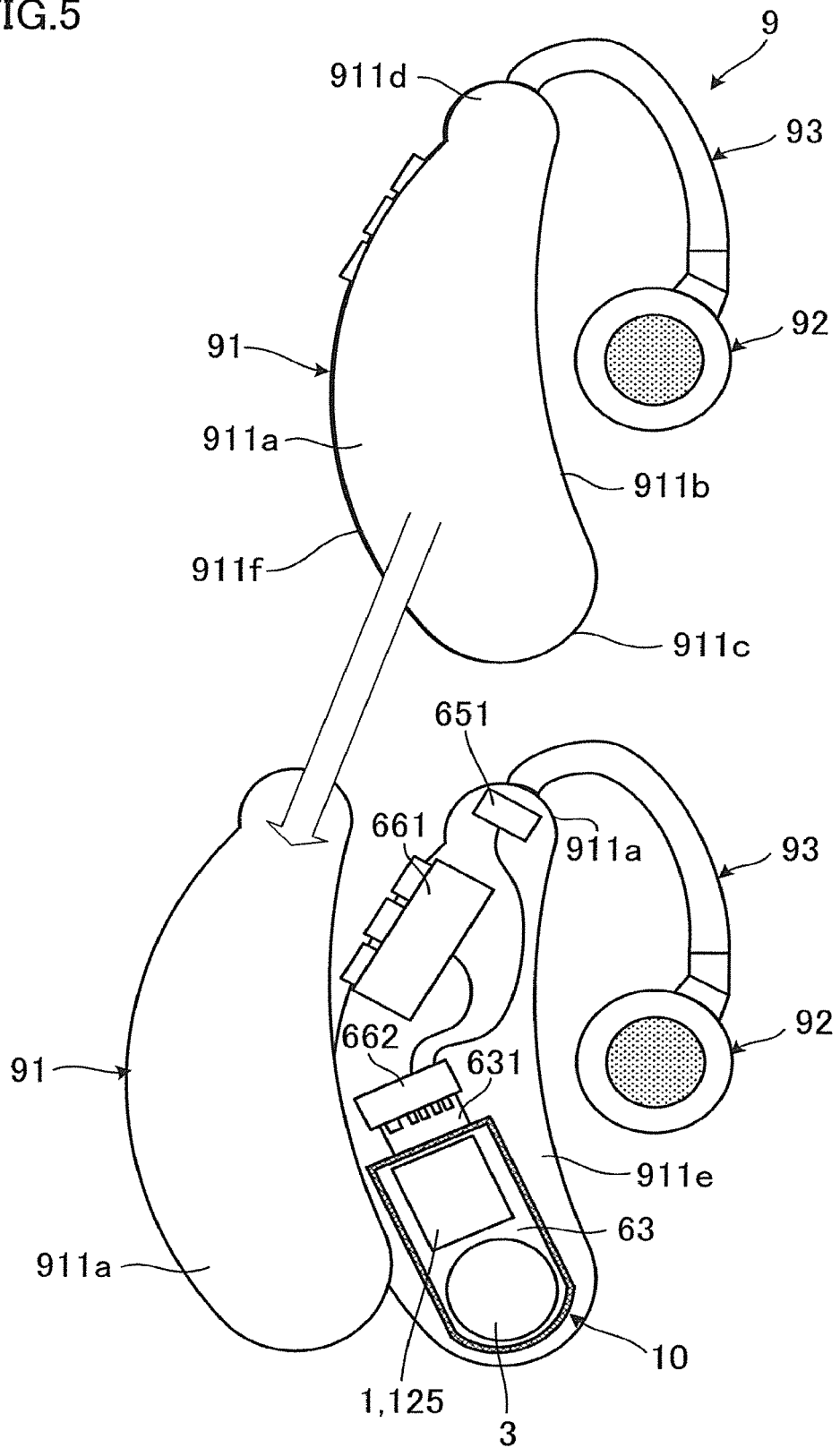
FIG. 5 shows the outline of ear-hook hearing aids.

As shown in FIG. 5, the ear-hook hearing aids 9 include a hearing aid main body 91 attached to the auricle, an ear mold 92 arranged to contact with the opening of the ear hole or its surroundings, a connecting portion 93 connecting the hearing aid main body 91 with the ear mold 92, a control substrate 63 including a power source circuit substrate 1 and a controller 125, and an output unit 65 and an input unit 66 which are connected to the control substrate 63. The output unit 65 is constituted by a member such as a speaker 651 configured to output sound. The input unit 66 is constituted by members such as an operation button 661 for controlling sound volume and switching of the power source and a sound concentrating microphone configured to convert outside sound into an electric sound signal.

The hearing aid main body 91 has a hexahedral housing (outer wall member) which is curved from the top part to the bottom part to extend along the root of the auricle. That is to say, the housing of the hearing aid main body 91 includes an upper surface part 911*d* at the top part, a bottom surface part 911*c* at the bottom part, a head-contacting surface part 911*a* contacting with the head, an auricle-contacting part 911*e* arranged to oppose the head-contacting surface part 911*a* and contact with the auricle, an inner contacting surface part 911*b* surface-contacting with the root of the auricle along the same, and an outer surface part 911*f* arranged to oppose the inner contacting surface part 911*b*. The hearing aid main body 91 is structured to be dividable in two, i.e., into the head-contacting surface part 911*a* and the auricle-contacting part 911*e*. As such, the head-contacting surface part 911*a* functions as a lid whereas the auricle-contacting part 911*e* functions as a container.

To the upper surface part 911*d* of the hearing aid main body 91, one end portion of the connecting portion 93 is connected. The connecting portion 93 is a hollow tube in shape. The other end portion of the connecting portion 93 is connected to the ear mold 92. With this arrangement, the ear-hook hearing aids 9 outputs sound collected and amplified by the hearing aid main body 91 from the speaker 651 to the ear mold 92 via the connecting portion 93, and allows the user of the ear-hook hearing aids 9 to receive the sound in a clear manner.

(Hearing Aids: Ear-Hook Hearing Aids 9: Module Component 10)

The ear-hook hearing aids 9 arranged as above include a module component 10 which is detachable and provided at a predetermined position. The module component 10 is equivalent to the portable device 6. The module component 10 has a power receiving function of receiving power by the resonance phenomenon, a secondary battery function of being chargeable and dischargeable, a charging and discharging function of charging and discharging the secondary battery, and a control function of controlling the components of the ear-hook hearing aids 9.

Figure 6A:
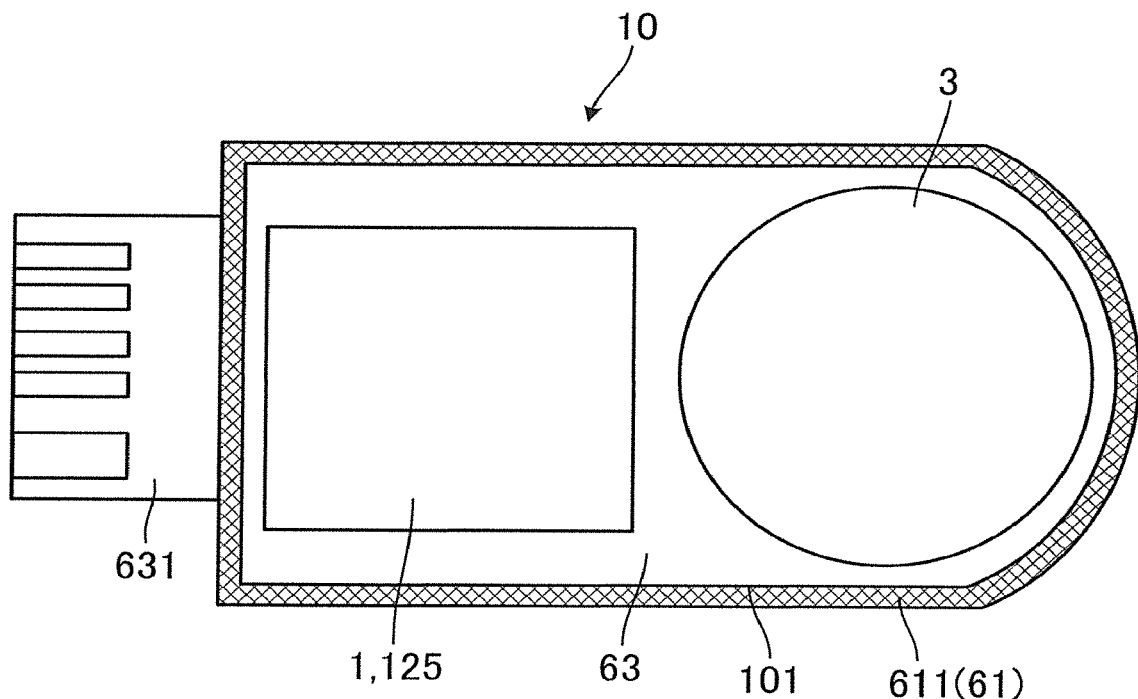
FIG. 6A is a plan view of a module component.
Figure 6B:
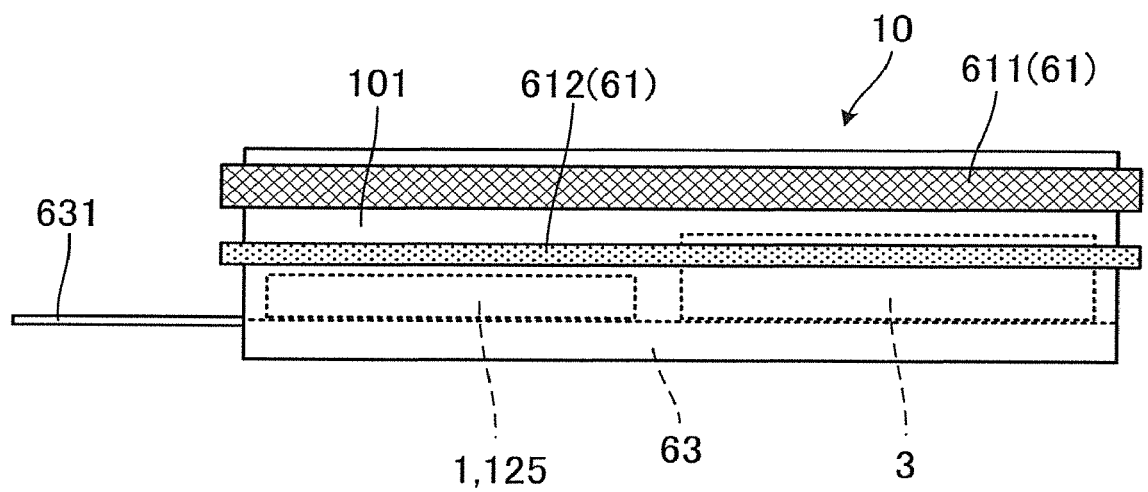
FIG. 6B is a front elevation of the module component.

As shown in FIG. 6A and FIG. 6B, the module component 10 includes a control substrate 63 which is a flat plate in shape and a power source circuit substrate 1 and a secondary battery 3 both provided on the upper surface of the control substrate 63. The power source circuit substrate 1 may be formed as a part of the control substrate 63. The power source circuit substrate 1 includes the above-described rectification-stabilization unit 111 and the like and a controller 125. Around the control substrate 63, a wall member 101 is provided. The wall member 101 is made of a conductive material such as metal. On the outer circumferential surface of the wall member 101, a power-receiving resonance coil 611 and a power-taking coil 612 are provided. The power-receiving resonance coil 611 and the power-taking coil 612 are made of a copper wire material coated by an insulation film.

As such, because the wall member 101 functioning as a magnetic member is provided to cover the inner circumferential surfaces of the power-receiving resonance coil 611 and the power-taking coil 612, the power source circuit substrate 1 provided on the inner circumference sides of the power-receiving resonance coil 611 and the power-taking coil 612 is arranged in a magnetic field space having a relatively low magnetic field strength. As a result, the power source circuit substrate 1 provided on the control substrate 63 is less influenced by a magnetic field when the power-receiving module 61 receives power.

In addition to the above, the inner circumference side of the wall member 101 is filled with solidified resin to cover the power source circuit substrate 1 and the control substrate 63. With this, in the module component 10, the power source circuit substrate 1, the secondary battery 3, or the like is less likely to be damaged by collision or water leakage.

From an end face of the control substrate 63, a terminal portion 631 protrudes. The terminal portion 631 is connected to the controller 125, and includes a control signal terminal, a GND terminal, a power source terminal, or the like. The terminal portion 631 functions as a male connector, and a female connector 662 is detachably attached thereto. The female connector 662 is connected with an output unit 65 of the speaker 651 or the like and an input unit 661 of the operation button 661, the sound concentrating microphone, or the like.

With the module component 10 arranged as above, an operation to manufacture or repair the ear-hook hearing aids 9 can be completed by detaching and attaching each module component 10, and hence the manufacturing and repairing the ear-hook hearing aids 9 can be easily done in a short time. Furthermore, as the size, shape, and the terminal portion 631 of each module component 10 is standardized, various types of portable devices including hearing aids can share the same module component 10.

While in Embodiment 1 the wall member 101 functioning as a magnetic member covers the circumference of the control substrate 63, the lower surface of the module component 10 (lower surface of the control substrate 63) may be further covered with a magnetic member or the top surface of the module component 10 may be further covered with a magnetic member. In such a case, each component on the control substrate 63 is arranged in a magnetic field space having a lower magnetic field strength.

(Charger 7 Corresponding to Ear-Hook Hearing Aids 9)

Figure 7:
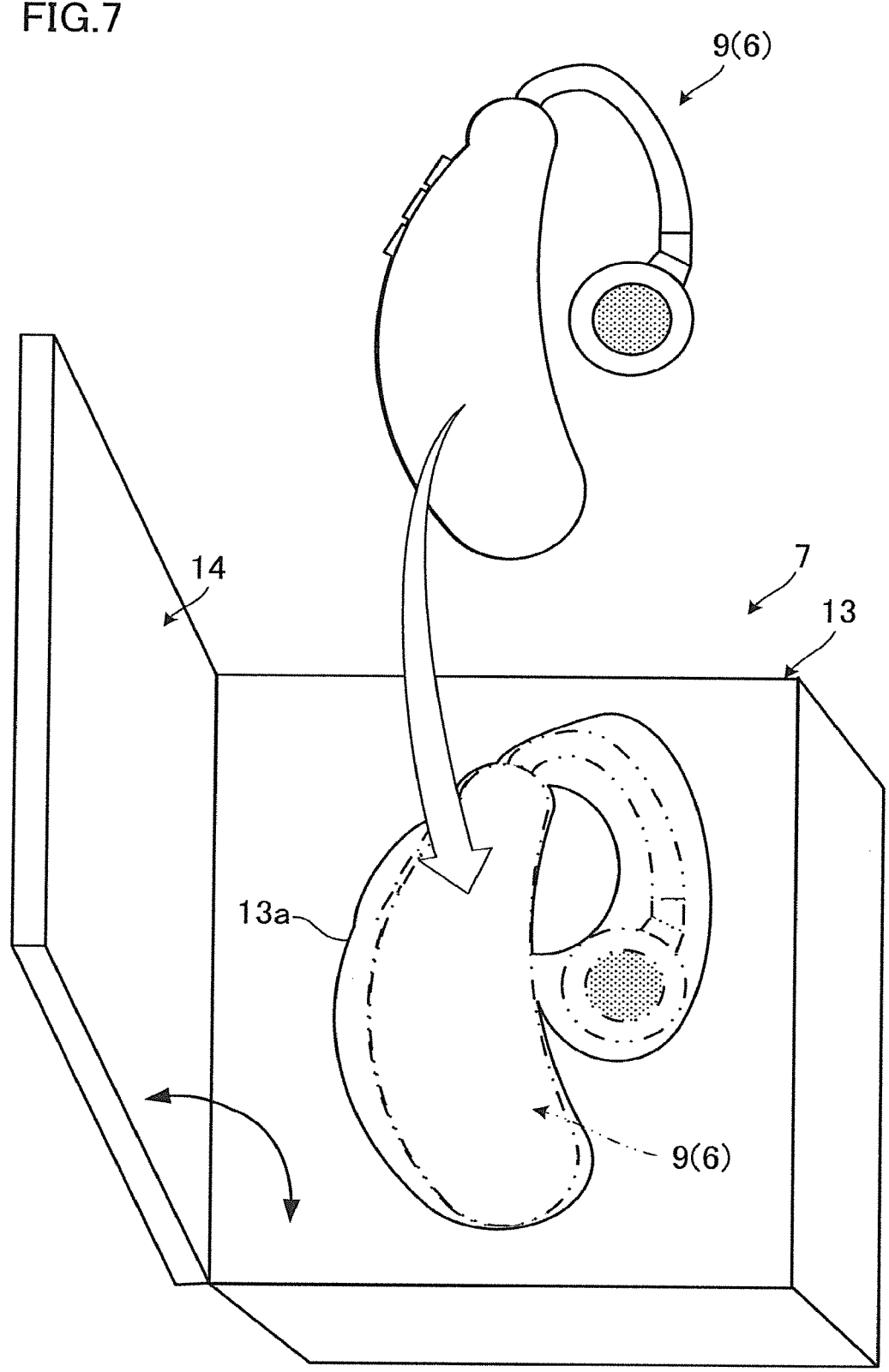
FIG. 7 shows the outline of a charger.

The ear-hook hearing aids 9 is charged by a charger 7 corresponding to the ear-hook hearing aids 9. The charger 7 includes, for example, as shown in FIG. 7, a supporting stand 13 which detachably supports the ear-hook hearing aids 9 in a predetermined power supply posture. To be more specific, the supporting stand 13 includes a concave portion 13a in which the ear-hook hearing aids 9 can be accommodated. The concave portion 13a is formed to position the ear-hook hearing aids in the horizontal direction and the height direction (vertical direction). The positioning in the height direction is done in such a way that, when the ear-hook hearing aids 9 are mounted in the concave portion 13a, the lower surface of the ear-hook hearing aids 9 contacts with the concave portion 13a on account of gravity.

As such, as the ear-hook hearing aids 9 are positioned by the concave portion 13a in the horizontal direction and the height direction when the ear-hook hearing aids 9 are mounted in the concave portion 13a of the supporting stand 13, the distance and the positional relation between the power-receiving module 61 of the ear-hook hearing aids 9 and the power-supplying module 71 of the charger 7 are maintained to be constant, and hence charging with a voltage corresponding to the charging characteristic of the secondary battery 3 is possible. It is noted that the shape of the concave portion 13a of the supporting stand 13 is an example in case of the ear-hook hearing aids 9, and the shape is suitably changed in accordance with the type and size of the hearing aids.

In addition to the above, the charger 7 includes a cover member 14 which is able to cover an exposed part (upper surface side) of the ear-hook hearing aids 9 supported at the supporting stand 13. The cover member 14 is provided so that the top surface of the supporting stand 13 is openable. The cover member 14 is provided with a power-supplying module 71 which supplies power by the resonance phenomenon to the power-receiving module 61 of the ear-hook hearing aids 9 supported by the supporting stand 13. The power-supplying module 71 is arranged to oppose the power-receiving module 61 of the ear-hook hearing aids 9 when the cover member 14 covers the exposed part of the ear-hook hearing aids 9. With this arrangement, because the charging is performed only when the cover member 14 covers the ear-hook hearing aids 9, whether the charging is being executed or stopped can be identified by checking whether the ear-hook hearing aids 9 are covered with the cover member 14. To put it differently, in the charger 7, whether the charging is performed or not is identified in accordance with the opening/closing state of the cover member 14.

In addition to the above, the power-supplying module 71 may be provided in the supporting stand 13. Furthermore, being similar to the ear-hook hearing aids 9, the charger 7 may be arranged such that, a space part having a low magnetic field is generated at or around the inner side of the power-supplying module 71 during the power supply by the resonance phenomenon, and the controller 73 or the like is arranged in this space part. This makes it possible to downsize the charger 7 in addition to the ear-hook hearing aids 9.

Figure 1:
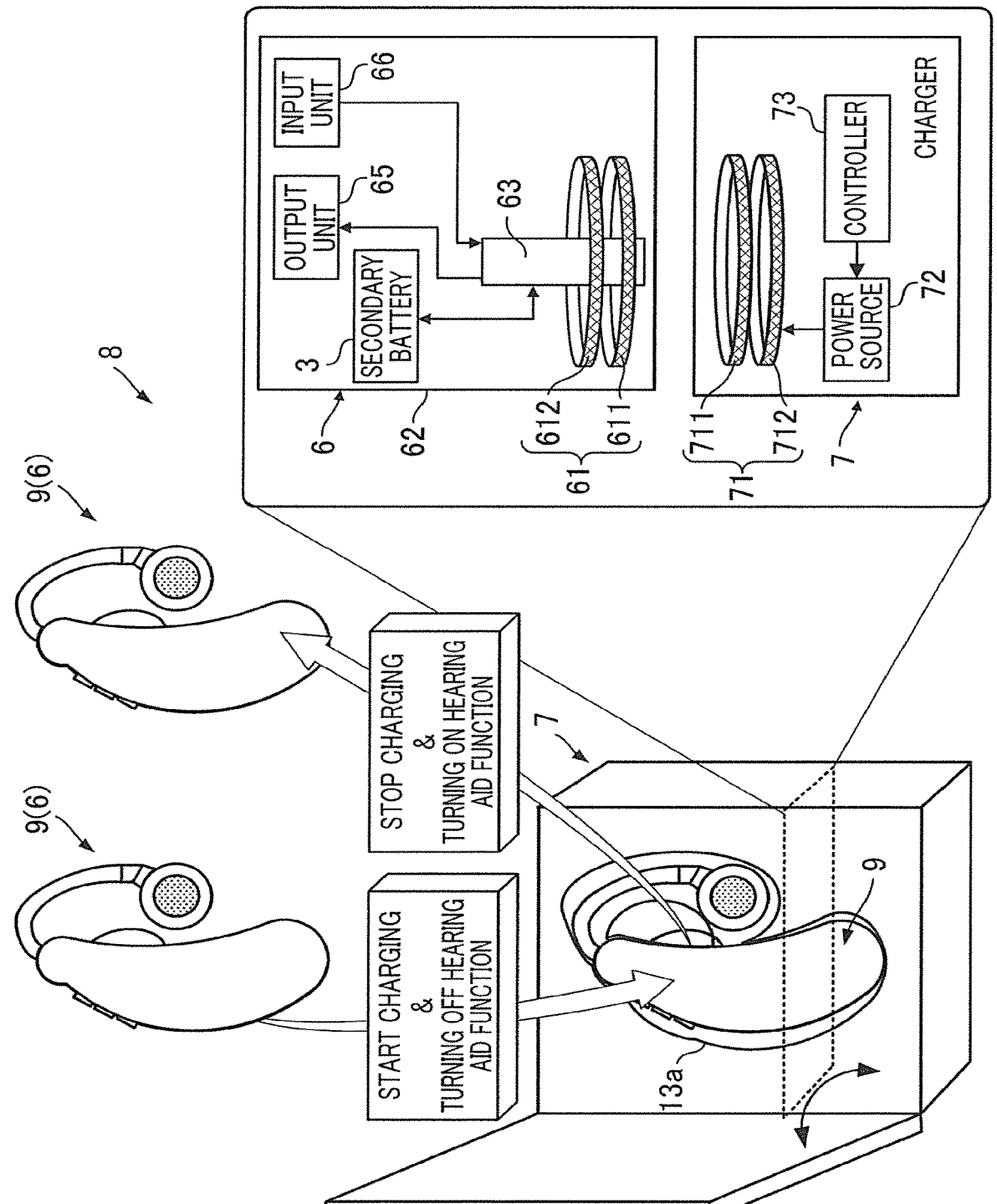
FIG. 1 shows an example of the use of ear-hook hearing aids.

When the ear-hook hearing aids 9 are mounted in the concave portion 13a of the supporting stand 13 of the charger 7, the power-supplying module 71 of the charger 7 opposes the power-receiving module 61 of the ear-hook hearing aids 9. As shown in FIG. 1, the charging to the secondary battery 3 starts simply by mounting the ear-hook hearing aids 9 on the supporting stand 13 of the charger 7. Furthermore, the power supply from the secondary battery 3 of the ear-hook hearing aids 9 to the output unit 65 such as the speaker 651 and the input unit 661 (driving component 5) such as the operation button 661 and the sound concentrating microphone can be turned off in such a way that the detection unit 123 detects DC power output from the rectification-stabilization unit 111 to the charging unit 112 during the charging and outputs a detection signal (low-level detection signal) indicating the detection to the switching controller 122, and the switching controller 122 having received the detection signal (low-level detection signal) changes the state of the transformation unit (processing unit) 124 to the stopped state. To put it differently, the start of the charging and the turning off of the hearing aid function are performed simply by attaching the ear-hook hearing aids 9 to the charger 7.

In the meanwhile, as shown in FIG. 1, as the ear-hook hearing aids 9 are lifted up from the supporting stand 13 of the charger 7, the charging to the secondary battery 3 is stopped. Furthermore, the power supply from the secondary battery 3 of the ear-hook hearing aids 9 to the output unit 65 such as the speaker 651 and the input unit 661 (driving component 5) such as the operation button 661 and the sound concentrating microphone can be turned on in such a way that the detection unit 123 detects that no DC power is output from the rectification-stabilization unit 111 to the charging unit 112 upon the end of the charging and sends, to the switching controller 122, a detection signal (high-level detection signal) indicating that no DC power is output, and the switching controller 122 having received the detection signal (high-level detection signal) changes the state of the transformation unit (processing unit) 124 to the operation state. To put it differently, the stop of the charging and the turning on of the hearing aid function are performed simply by detaching the ear-hook hearing aids 9 from the charger 7.

With the arrangement above, a function of stopping the charging and the operation is realized without requiring a manual on-off mechanism or an automatic on-off mechanism using a mechanical contact. That is to say, based on whether there is power supply from the outside, the prohibition of the operation of the driving component 5 such as the output unit 65 such as the speaker 651 and the input unit 661 such as the operation button 661 and the sound concentrating microphone during the charging and the allowance of the operation of the driving component 5 such as the output unit 65 such as the speaker 651 and the input unit 661 such as the operation button 661 and the sound concentrating microphone upon the end of the charging are switched. This improves the handling of the ear-hook hearing aids 9 (portable device 6) when the function of stopping the charging and the operation is performed, and the downsizing and the manufacture of the ear-hook hearing aids 9 become easy because a manual on-off mechanism or an automatic on-off mechanism using a mechanical contact is unnecessary.

Furthermore, with the arrangement above, because the charging unit 112, the transformation unit (processing unit) 124, the detection unit 123, and the switching controller 122 are integrated into one chip as an integrated circuit substrate, the ear-hook hearing aids 9 are further downsized.

Furthermore, with the arrangement above, because contactless power supply is employed, the handling at the time of charging the secondary battery 3 of the ear-hook hearing aids 9 is improved.

Furthermore, with the arrangement above, contactless power supply is possible, and the freedom of design in charging the secondary battery 3 of the ear-hook hearing aids 9 is improved because the power supply by the resonance phenomenon with which the distance of power supply is increased as compared to the electromagnetic induction is employed. Furthermore, because the power-receiving module 61 to which power is supplied by the resonance phenomenon is provided in the ear-hook hearing aids 9, a space part having a small magnetic field is generated at around the power-receiving module 61, and this space part is effectively used as the arrangement location of the power source circuit substrate 1. With this, even in the ear-hook hearing aids 9 (portable device 6) in which it is difficult to secure an arrangement place of a component, the arrangement place of the power source circuit substrate 1 is easily secured and hence the downsizing of the ear-hook hearing aids 9 is realized.

In addition to the above, with the arrangement above, because the ear-hook hearing aids 9 are arranged to be close to the charger 7 to the extent that the resonance phenomenon between the power-receiving module 61 of the ear-hook hearing aids 9 and the power-supplying module 71 of the charger 7 occurs, the secondary battery 3 of the ear-hook hearing aids 9 is charged in a contactless manner. During this charging, the operation of each driving component 5 in the ear-hook hearing aids 9 is automatically prohibited without requiring an operation of push button or the like. To put it differently, with the arrangement above, the charging of the secondary battery 3 is performed while the operation of the driving component 5 is automatically prohibited, only by mounting the ear-hook hearing aids 9 on the charger 7, and the charging of the secondary battery 3 is stopped while the operation of the driving component 5 is automatically allowed, only by detaching the ear-hook hearing aids 9 from the charger 7. As such, the charging and the stop of the charging of the secondary battery 3 in sync with the operation of the driving component 5 are easily switched by a simple operation such as attaching or mounting the ear-hook hearing aids 9 to the charger 7.

In addition to the above, according to the method (power-supplying method) of charging the secondary battery 3 of the ear-hook hearing aids 9, the state of the transformation unit (processing unit) 124 is switched from the operation state to the stopped state when the input of power to the charging unit 112 is detected by the detection unit 123. To put it differently, when the secondary battery 3 is charged by the input of outside power in a contactless manner, the state of the transformation unit (processing unit) 124 is switched from the operation state to the stopped state when the detection unit 123 detects the input of the outside power to the charging unit 112. This makes it possible to prohibit the operation of the driving component 5 when the secondary battery 3 is charged, and hence the handling of the ear-hook hearing aids 9 when the function of stopping the driving component 5 during the charging is performed is improved.

Embodiment 2

Embodiment 1 has described the arrangement having the function of charging the secondary battery 3 while stopping the power supply to the driving component 5 upon the attachment of the portable device 6 to the charger 7 and the function of stopping the charging of the secondary battery 3 while supplying power to the driving component 5 upon the detachment of the portable device 6 from the charger 7. For example, the charging system 8 shown in FIG. 1 is arranged to start the charging and to turn off of the hearing aid function upon the attachment of the ear-hook hearing aids 9 to the charger 7, and to stop the charging and to turn on the hearing aid function upon the removal of the ear-hook hearing aids 9 from the charger 7.

Figure 8:
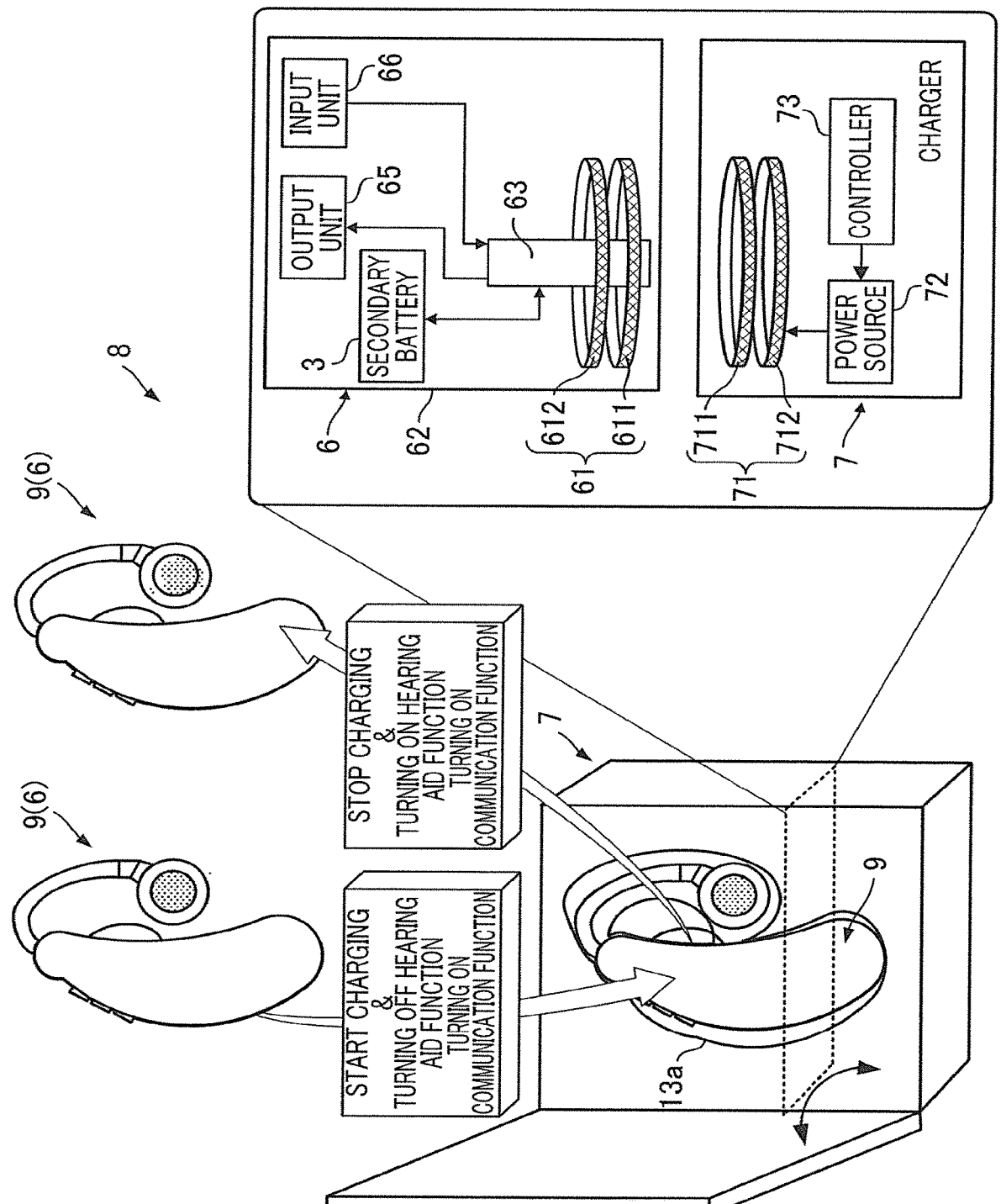
FIG. 8 shows the outline of the charger.

The portable device 6, the charging system 8, and the power source circuit substrate 1, however, are not limited to the arrangement having the functions above. As shown in FIG. 8, the portable device 6 may be arranged to have a function of charging the secondary battery 3 while stopping the power supply to a particular one of driving components 5 upon the attachment of the portable device 6 to the charger 7 and a function of stopping the charging of the secondary battery 3 while continuing power supply to a particular driving component 5 upon the removal of the portable device 6 from the charger 7. To be more specific, while the communication function is maintained to be always turned on, the start of the charging and the turning off of the hearing aid function are performed upon the attachment of the ear-hook hearing aids 9 to the charger 7, whereas the stop of the charging and the turning on of the hearing aid function are performed upon the removal of the ear-hook hearing aids 9 from the charger 7. The following will detail the arrangement of Embodiment 2.

(Structure of Power Source Circuit Substrate 1)

Figure 9:
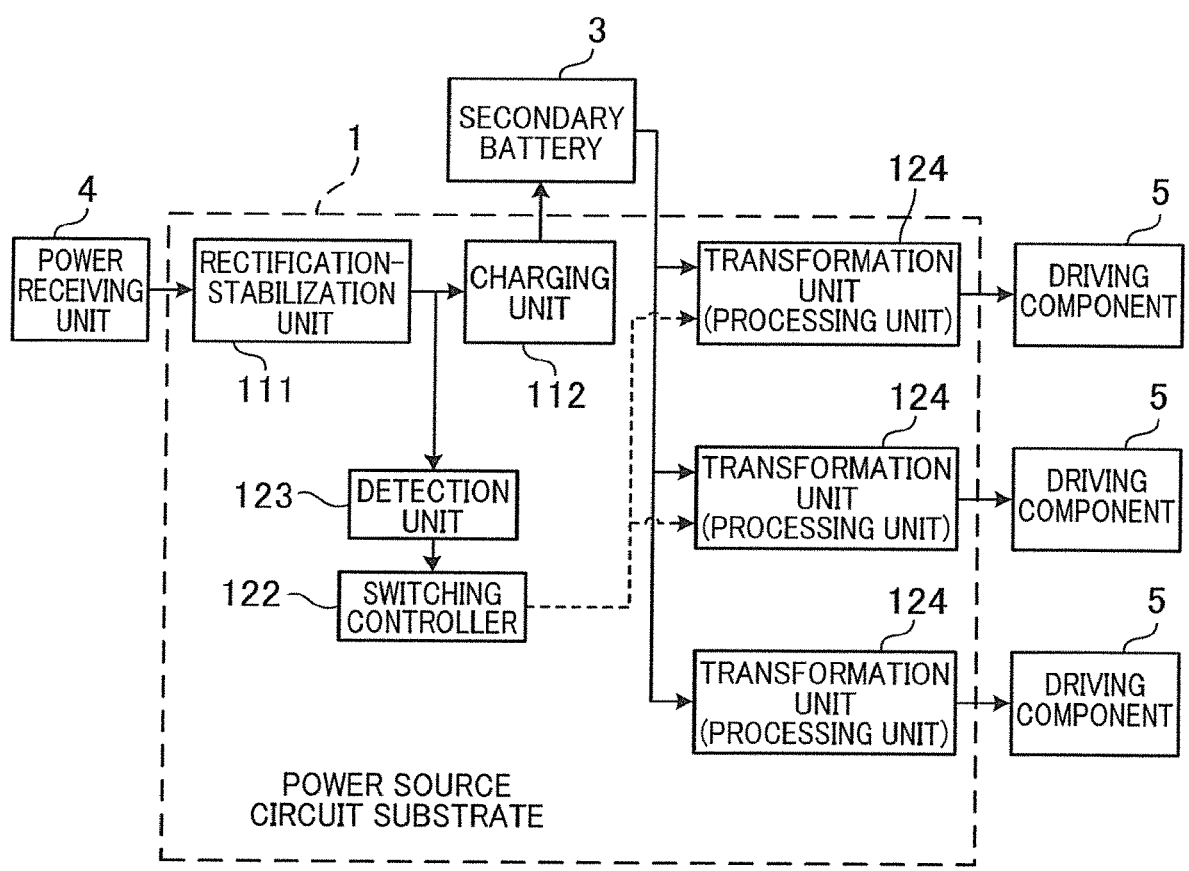
FIG. 9 is a detailed block diagram of the power source circuit substrate.

As shown in FIG. 9, a power source circuit substrate 1 of Embodiment 2 includes a rectification-stabilization unit 111, a charging unit 112, a detection unit 123, a switching controller 122, and transformation units 124, and the switching controller 122 is arranged to switch the state of at least one particular transformation unit 124 among the transformation units 124 from the operation state to the stopped state. With this, because a particular driving component 5 stopped during the charging and a driving component 5 driven during the charging are differentiated based on whether there is power supply from the outside, it is possible to perform the charging with minimum power consumption while maintaining a desired function. The arrangements other than the above are identical with those of Embodiment 1.

(Portable Device 6: Application Example of Power Source Circuit Substrate 1)

Now, the following will describe a case where the power source circuit substrate 1 arranged as above is employed in a portable device 6. While the description below deals with a case where driving components 5 driven at different voltages, the driving components may operate at the same voltage.

The portable device 6 includes a secondary battery 3, driving components 5 driven by power at different voltages supplied from the secondary battery 3, transformation units 124 (first voltage dropping units 124a, second voltage dropping units 124b, and voltage boosting units 124c) each of which output the charged power of the secondary battery 3 at a voltage suitable for the operation of each driving component 5, and switching controllers 1221, 1222, and 1223 configured to switch the state of a particular transformation unit 124 (first voltage dropping unit 124a and second voltage dropping unit 124b) which is at least one of the transformation units 124 from the operation state to the stopped state.

Figure 10:
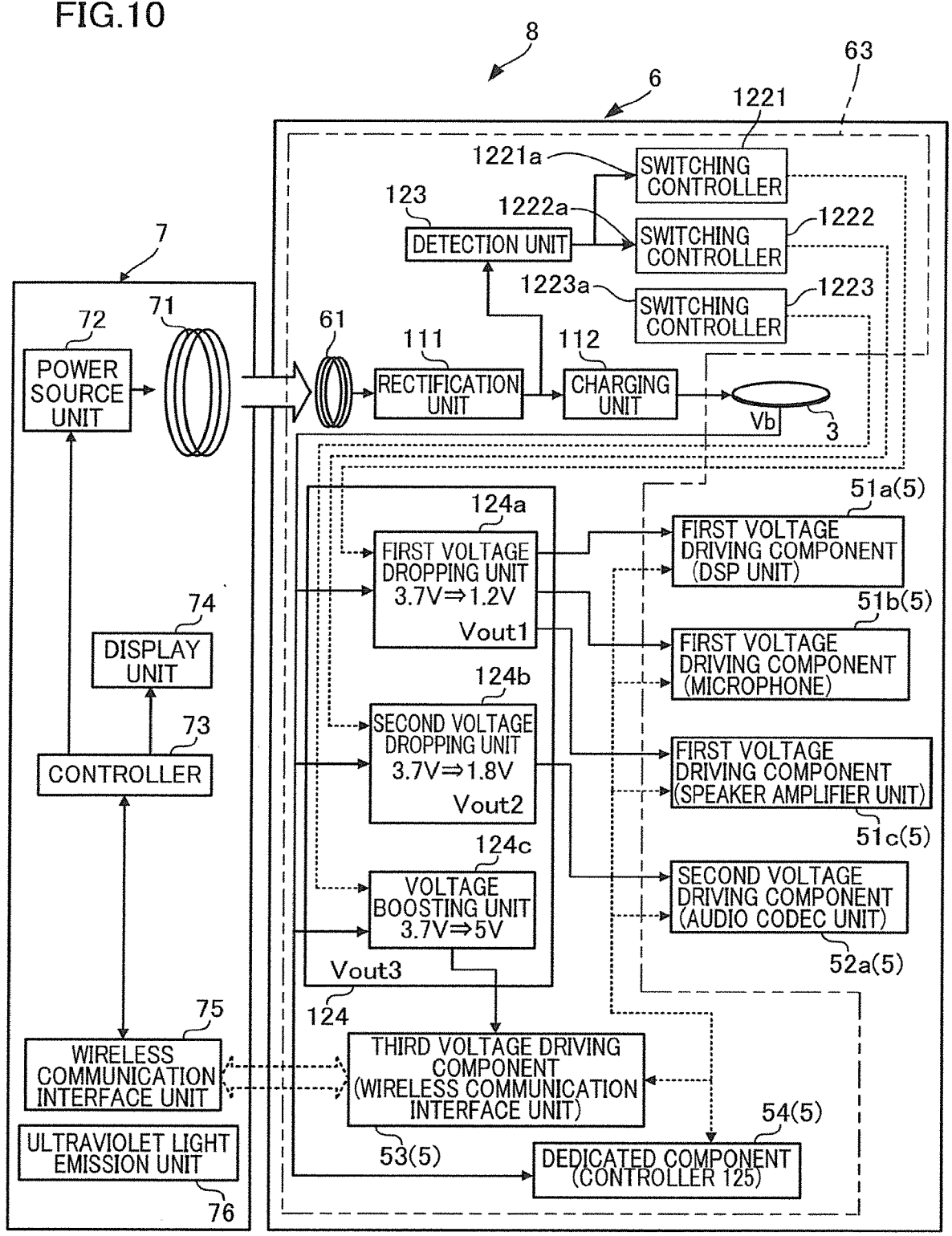
FIG. 10 is a block diagram of the charging system.

The switching controllers 1221, 1222, and 1223 are connected to the first voltage dropping unit 124a, the second voltage dropping unit 124b, and the voltage boosting unit 124c, respectively. As shown in FIG. 10, the switching controller 1221 and the first voltage dropping unit 124a, the switching controller 1222 and the second voltage dropping unit 124b, and the switching controller 1223 and the voltage boosting unit 124c are integrated as a one-chip IC which is an integrated circuit.

Figure 11:
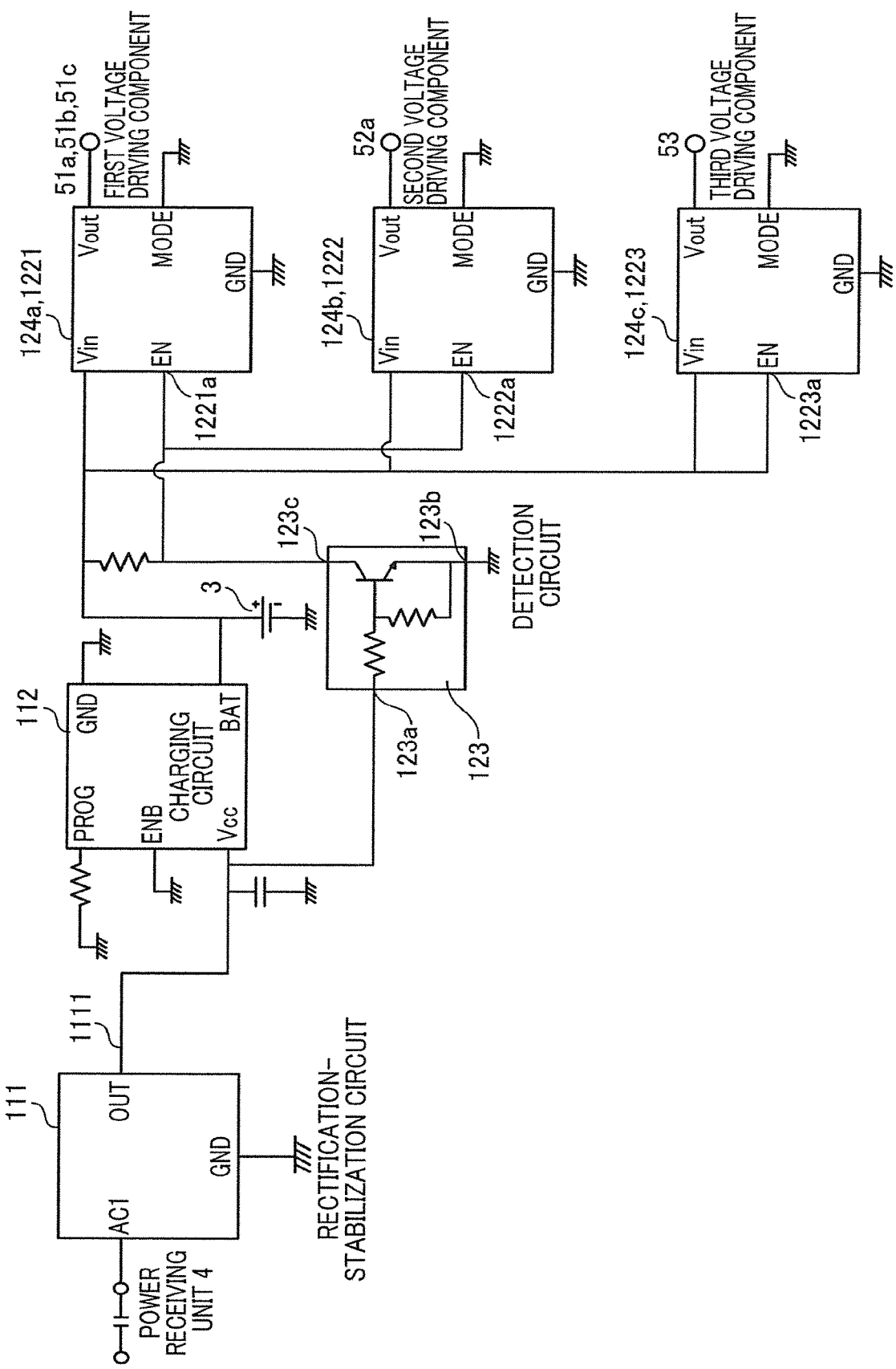
FIG. 11 is a circuit block diagram of the power source circuit substrate.

Furthermore, as shown in FIG. 11, input terminals 1221a and 1222a of the switching controllers 1221 and 1222 are connected to the detection unit 123. In the meanwhile, an input terminal 1223a of the switching controller 1223 is connected only to the secondary battery 3 and is in a high state. As such, while the first voltage dropping unit 124a and the second voltage dropping unit 124b are switchable between on and off based on a detection signal of the detection unit 123, the voltage boosting unit 124c is always in the on state.

The first voltage dropping unit 124a and the second voltage dropping unit 124b are voltage dropping circuits that decrease a voltage to be lower than the terminal voltage of the secondary battery 3, and each of which may be a linear regulator or a switching regulator. In the meanwhile, the voltage boosting unit 124c is a voltage boosting circuit that increases a voltage to be higher than the terminal voltage of the secondary battery 3, and may be a switching regulator.

The first voltage dropping unit 124a is connected to first voltage driving components 51a to 51c and supplies 1.2V power to these components 51a to 51c. The second voltage dropping unit 124b is connected to a second voltage driving component 52a and supplies 1.8V power to the component 52a. The voltage boosting unit 124c is connected to a third voltage driving component 53 and supplies 5V power to the third voltage driving component 53. These first to third voltage driving components 51a to 51c, 52a, and 53 are components that operate at voltages different from the nominal voltage of the secondary battery 3.

Examples of the first voltage driving component 51 with the 1.2V operating voltage include a DSP (Digital Signal Processor) and a microphone. Examples of the second voltage driving component 52 with the 1.8V operating voltage include an audio CODEC component. Examples of the third voltage driving component 53 with the 5V operating voltage includes a wireless communication interface component. In this case, during the charging of the portable device 6, the DSP, the microphone, and the audio CODEC component are stopped whereas the wireless communication interface component is in the operation state. In this regard, in order to prevent the wireless communication interface component from operating when the charging is stopped, a NOT circuit that inverts the high level and the low level of an input signal may be provided on the stage preceding the input terminal 1223a of the switching controller 1223.

With this arrangement, even if first to third voltage driving components 51a to 51c, 52a, and 53 driven at different voltages are included in the portable device 6, the portable device 6 exerts performances similar to those of a device constituted by driving components 5 driven at the same operating voltage, because the first voltage dropping unit 124a, the second voltage dropping unit 124b, and the voltage boosting unit 124c transform the voltage of the secondary battery 3 into voltages suitable for the operations of the first to third voltage driving components 51a to 51c, 52a, and 53 and then supplies the power of the secondary battery 3 to the first to third voltage driving components 51a to 51c, 52a, and 53. This makes it possible to choose the first to third voltage driving components 51a to 51c, 52a, and 53 from components with many different operating voltages, and hence the cost reduction of the portable device 6 is achieved by selecting inexpensive components as the first to third voltage driving components 51a to 51c, 52a, and 53.

In addition to the above, the charging of the secondary battery 3 is efficiently done in such a way that the operations of the first to second voltage driving components 51a to 51c and 52a connected to the first voltage dropping unit 124a and the second voltage dropping unit 124b are stopped during the charging to reduce the power consumption.

The first voltage dropping unit 124a and the second voltage dropping unit 124b are groped transformation units which are provided in a dispersed manner for each particular group of components. Each particular group indicates a group of components driven at the same operating voltage, a group of components provided in each arrangement location, or a group of components in each layer or surface when the components are mounted on three-layer substrates or on both surfaces of a substrate.

As such, the portable device 6 is arranged such that groped transformation units are provided in the vicinity of each component and power is supplied at suitable voltages as compared to a case where the first voltage dropping unit 124a and the second voltage dropping unit 124b are provided at a single part in a concentrated manner, with the result that influences of voltage decrease and noise due to the wiring of the groped transformation units and of the components are restrained. Furthermore, because the groped transformation units are provided in a dispersed manner for each particular group of components, the circuit configuration of the transformation unit 124 is optimized in consideration of the arrangement locations and the characters of the particular group, while restraining the influences of noise and voltage decrease.

In the meanwhile, the voltage boosting unit 124c is an individual transformation unit which supplies 5V power to only the single third voltage driving component 53. The portable device 6 may include both groped transformation units and an individual transformation unit or may include only groped transformation units or an individual transformation unit.

The portable device 6 preferably includes a secondary battery 3 having a nominal voltage which is higher than the nominal voltage of an air battery. Such a secondary battery 3 is particularly preferable when the portable device 6 is hearing aids such as the ear-hook hearing aids 9. This is because, even if the secondary battery 3 outputs charged power at a nominal voltage higher than the nominal voltage of the air battery or the battery voltage is changed over the discharging time, the transformation unit 124 outputs the charged power of the secondary battery 3 at voltages suitable for the operations of the respective driving components 5, and hence each driving component 5 is stably operated with the charged power of the secondary battery 3 in the same manner as in the case where each driving component 5 is driven by the air battery.

With this, performances similar to those of a portable device employing a known air battery are achieved, and the replacement of the secondary battery 3 is less frequently required because, even if the secondary battery 3 is depleted in a short time on account of the increase in the power consumption of the portable device 6, the portable device 6 can be repeatedly used by recharging. Furthermore, because a structure or the like for taking in air as in the case of the air battery is unnecessary, the structure of the portable device 6 is simplified and the waterproof property of the portable device 6 is improved.

The nominal voltage is a value indicating a standard voltage between terminals when a battery is used in a normal state. A terminal voltage higher than the nominal voltage is obtained when the battery is almost fully charged, but the terminal voltage is lower than the nominal voltage when discharging has been advanced or a large current is supplied to a load. The nominal voltage of the air battery falls within the range of 1.2V to 1.4V. The nominal voltage of a nickel-hydrogen secondary battery also falls within the range of 1.2V to 1.4V in the same manner as in the air battery. Examples of the secondary battery 3 having a nominal voltage higher than the nominal voltage of the air battery include lead storage battery, a valve-regulated lead storage battery, a lithium air battery, a lithium ion battery, a lithium polymer battery, a manganese dioxide-lithium secondary battery, and a titanium carbon lithium secondary battery.

The nominal voltages of the lithium ion battery and the lithium polymer battery fall within the range of 3.6V to 3.7V. The nominal voltage of the manganese dioxide-lithium secondary battery is 3.0V. The nominal voltage of the titanium carbon lithium secondary battery is 1.5V. The voltage range between a discharging stop voltage and a charging stop voltage in the lithium ion battery is 2.7V to 4.2V. The discharging stop voltage indicates the minimum discharging voltage with which the discharging is safely done, whereas the charging stop voltage indicates the maximum charging voltage with which the charging is safely done.

The secondary battery 3 is preferably a lithium ion battery. In this case, the nominal voltage of the lithium ion battery falls within the range of 3.6V to 3.7V and is higher than the nominal voltages of the air battery and the nickel hydrogen secondary battery, which are in the range of 1.2V to 1.4V. Furthermore, the lithium ion battery has such a discharge characteristic that the battery voltage decreases from around 4.2V to around 2.7V in accordance with the discharging. Because the energy density of this battery is higher than those of the air battery and the nickel hydrogen secondary battery, the portable device 6 can be driven for a long time as compared to a case where the air battery or the nickel hydrogen secondary battery is employed.

In addition to the above, the portable device 6 includes a driving component 5 as a component 54 which is dedicated to the secondary battery 3 and operates at the nominal voltage of the secondary battery 3. For example, when the secondary battery 3 is a lithium ion battery, the dedicated component 54 is a micro computer (controller 125) which operates at around 3.6V to 3.7V which fall within the range of the nominal voltage of the lithium ion battery. The micro computer which is the dedicated component 54 obtains temperature data of the secondary battery 3 or the like and controls the operations of the first to third voltage driving components 51a to 51c, 52a, and 53. For example, the micro computer has functions such as a function of notifying the charger 7 that the charging is in progress by sending a charging response signal to the charger 7 at constant time intervals during the charging and a function of sending state data such as the temperature data of the secondary battery 3 to the charger 7.

The dedicated component 54 above is directly connected to the secondary battery 3. With this, because the dedicated component 54 is directly operated using the terminal voltage of the secondary battery 3, it is unnecessary to provide a transformation unit 124 for the dedicated component 54. As a result, power supply to the dedicated component 54 by the transformation unit 124 is unnecessary, and cost reduction is achieved by lowering the power supply capability of the transformation unit 124 as compared to a case where power is supplied to all driving components 5 via the transformation unit 124. The dedicated component 54 may operate at a voltage range between the charging stop voltage and the discharging stop voltage of the lithium ion battery. The arrangements other than this are identical with those in Embodiment 1.

(Charger 7 and Charging System 8)

The charger 7 arranged to charge the portable device 6 above includes a charging stand, a power-supplying module 71, a power source unit 72, and a controller 73. The charger 7 and the portable device 6 constitute a charging system 8.

Figure 12:
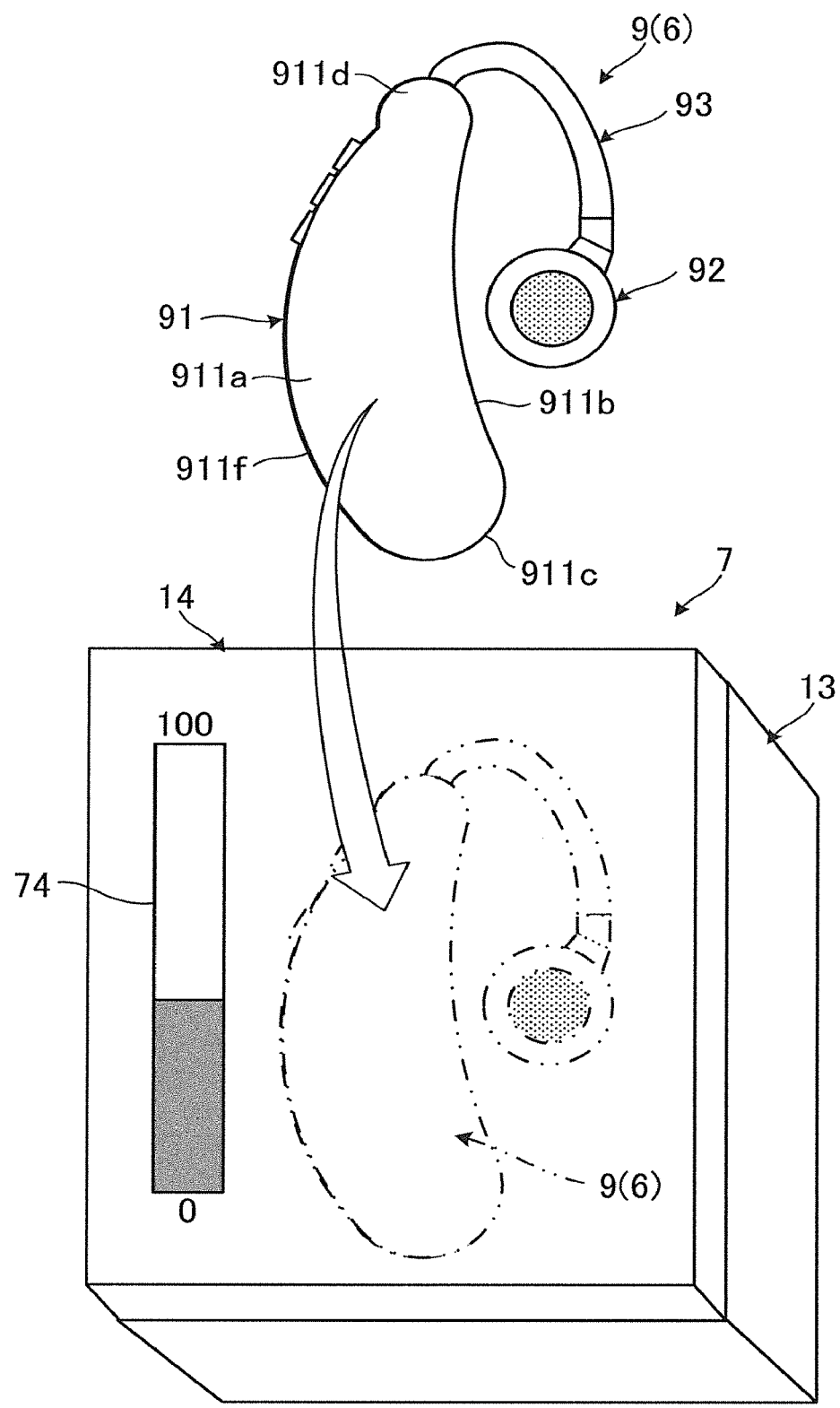
FIG. 12 shows the outline of the ear-hook hearing aids.
Figure 13:
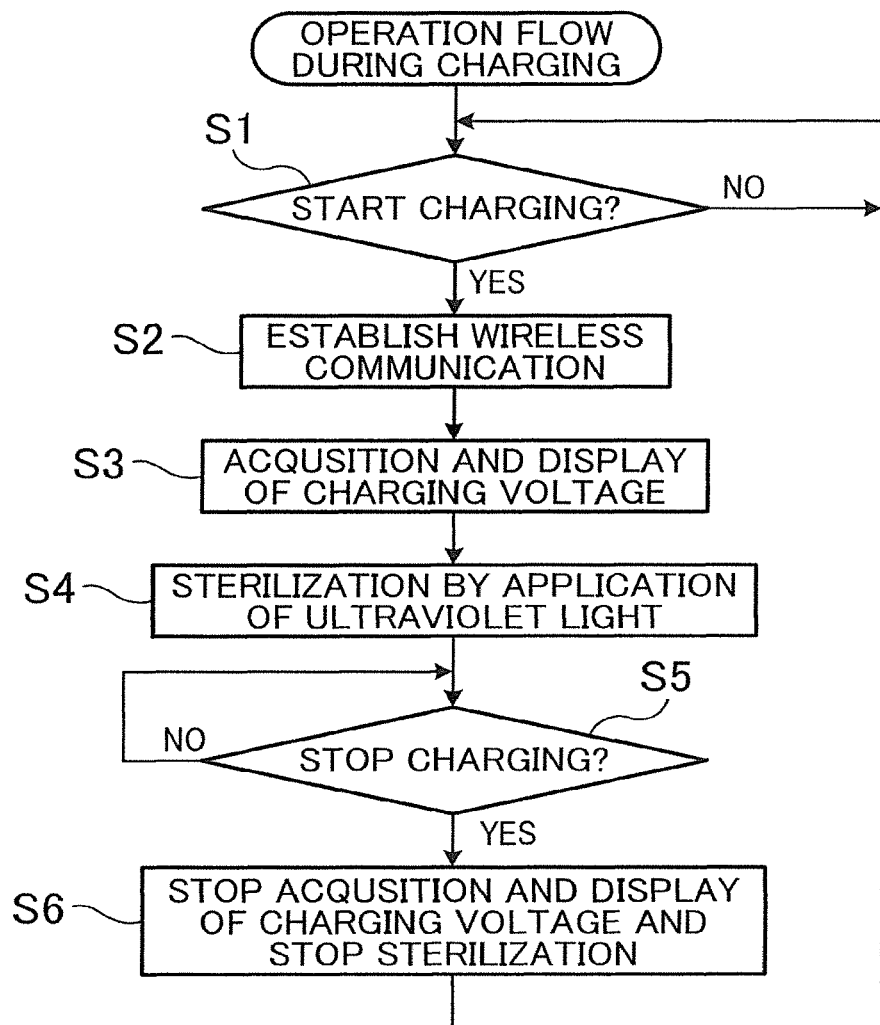
FIG. 13 shows an operation flowchart during the charging.

The charger 7 includes a display unit 74, a wireless communication interface unit 75, and an ultraviolet light emission unit 76. The display unit 74 is constituted by a liquid crystal display device, an LED array, or the like, and is provided on the cover member 14 as shown in FIG. 12. The display unit 74 displays information such as charging information regarding the charging such as a charge amount, a temperature, and a charging time of the secondary battery 3 in the portable device 6, operation information of the charger 7 such as charging in progress and sterilization in progress, and information regarding whether the portable device 6 is attached. The wireless communication interface unit 75 performs wireless communication with the wireless communication interface unit which is a driving component 53 of the portable device 6. The communication distance is preferably restricted to be equal to or shorter than a predetermined distance to establish wireless communication only with the wireless communication interface unit of the portable device 6 mounted on the charger 7, in order to avoid crosstalk.

As such, the portable device 6 of the charging system 8 includes, as the third driving component 53, a wireless communication interface unit (communication function member) which is configured to send state data indicating the state of the portable device 6. Furthermore, the charger 7 of the charging system 8 includes the wireless communication interface unit 75 (communication unit) which enables wireless communication with the wireless communication interface unit of the portable device 6 while the power-supplying module 71 supplies power to the power-receiving module 61, and the display unit 74 which is configured to display charging information based on the state data received by the wireless communication interface unit 75. With this, the charging system 8 is able to display, on the display unit 74, charging information such as a charge amount and a temperature of the secondary battery 3 of the portable device 6 by wireless communication while reducing the power consumption by stopping particular driving components (first and second voltage driving components 51a to 51c and 52a) during the charging. In this way, the charging system allows the user to easily recognize the timing of the completion of the charging.

The ultraviolet light emission unit 76 includes a light source configured to emit ultraviolet light for sterilizing the portable device 6 and a reflection mechanism such as a mirror which is provided on the inner surface of the cover member 14 or the supporting stand 13 to reflect ultraviolet light toward the portable device 6. Whether the ultraviolet light emission unit 76 emits the ultraviolet light is controlled by the controller 73. That is to say, the ultraviolet light emission unit 76 is controlled to emit the ultraviolet light only during the charging. The emission of the ultraviolet light may be stopped after a predetermined time elapses from the start of the charging. This arrangement restrains the deterioration of the portable device 6 due to the ultraviolet light.

The ultraviolet light emission unit 76 is preferably arranged such that terminals of a power line are provided in the cover member 14 and the supporting stand 13 to prevent the ultraviolet light emission unit 76 from emitting the ultraviolet light when the cover member 14 is open in the supporting stand 13, and when the cover member 14 is closed in the supporting stand 13, power is supplied to the light source of the ultraviolet light emission unit 76 as the terminals contact with each other. The charger 7 may include a cleaning mechanism which is able to clean the portable device 6 by using alcohol or water. The arrangements other than the above are identical with those of Embodiment 1.

(Operation of Charging System 8)

The charging system 8 arranged as above realizes a method of supplying power to the secondary battery 3, with which the state of at least one particular transformation unit 124 (the first voltage dropping unit 124a and the second voltage dropping unit 124b) among the transformation units 124 (the first voltage dropping unit 124a, the second voltage dropping unit 124b, and the voltage boosting unit 124c) is switched from the operation state to the stopped state when the detection unit 123 detects the input of outside power to the charging unit 112 from the charger 7. An operation of the charging system 8 realizing this power-supplying method will be described with reference to FIG. 12. The following description assumes that the charger 7 is connected to a domestic power source.

To begin with, whether the controller 73 of the charger 7 starts the charging is determined (S1). When the charging is not started (S1: NO), the standby state is continued as the step S1 is repeated. When the portable device 6 is mounted on the supporting stand 13 of the charger 7 and the cover member 14 is closed, the controller 73 of the charger 7 determines that the preparation for starting the charging has been done, based on a voltage change of the power source unit 72 and a detection signal from an unillustrated sensor. Then the display unit 74 notifies that the charging is started (S1: YES).

Subsequently, as the wireless power supply from the power-supplying module 71 to the power-receiving module 61 is performed and the voltage between the rectification-stabilization unit 111 and the charging unit 112 is increased, the detection unit 123 having detected the increase sends a low-level detection signal to the switching controllers 1221 and 1222, and the operations of the first and second voltage driving components 51a to 51c and 52a are prohibited by stopping the power supply from the first voltage dropping unit 124a and the second voltage dropping unit 124b. In the meanwhile, because no low-level detection signal is input to the switching controller 1223, the voltage boosting unit 124c connected to the switching controller 1223 and the third voltage driving component 53 connected to the voltage boosting unit 124c maintain the operation state. As a result, the communication between the portable device 6 and the charger 7 is established as the wireless communication interface unit which is the third voltage driving component 53 and the micro computer which is the dedicated component 54 operate even during the charging of the secondary battery 3 (S2). Furthermore, as sets of data of the portable device 6 are obtained at predetermined intervals and are sent to the charger 7 each time they are obtained, the display unit 74 displays the latest charging information (S3).

Subsequently, as power is supplied to the light source of the ultraviolet light emission unit 76, the light source emits ultraviolet light. The ultraviolet light is applied to the portable device 6 in the charger 7 to sterilize the portable device 6 (S4). With this, the portable device 6 is always kept clean as the breeding of germs is prevented and offensive smell caused by germs does not occur.

Subsequently, whether to stop the charging is determined (S5). When a predetermined time elapses from the start of the charging or the charge amount of the secondary battery 3 reaches a predetermined amount, the charging is continued until a predetermined power receiving stop condition, e.g., the temperature of the secondary battery 3 becomes equal to or higher than a predetermined temperature, is established (S5: NO). The charging is stopped when the power receiving stop condition is established (S5: YES), and then the charging voltage is obtained and the image display is stopped, and the sterilization is stopped as the emission of the ultraviolet light is stopped (S6). Then the process is executed again from S1.

Embodiment 3

Embodiment 1 and Embodiment 2 deal with the power source circuit substrate 1 and the portable device 6 in which, as shown in, for example, FIG. 2, the state of the transformation unit (processing unit) 124 is switched from the operation state to the stopped state only when the input of the power to the charging unit 112 is carried out. The disclosure, however, is not limited to this arrangement. That is to say, the power source circuit substrate 1 and the portable device 6 may be arranged such that the transformation unit (processing unit) 124 and the driving component 5 are switched from the operation state to the stopped state only when the charging of the secondary battery 3 by the charging unit 112 is carried out. It is noted that the transformation unit 124 is an example of the processing unit, and the processing unit encompasses all types of circuits executing signal processing.

Figure 14:
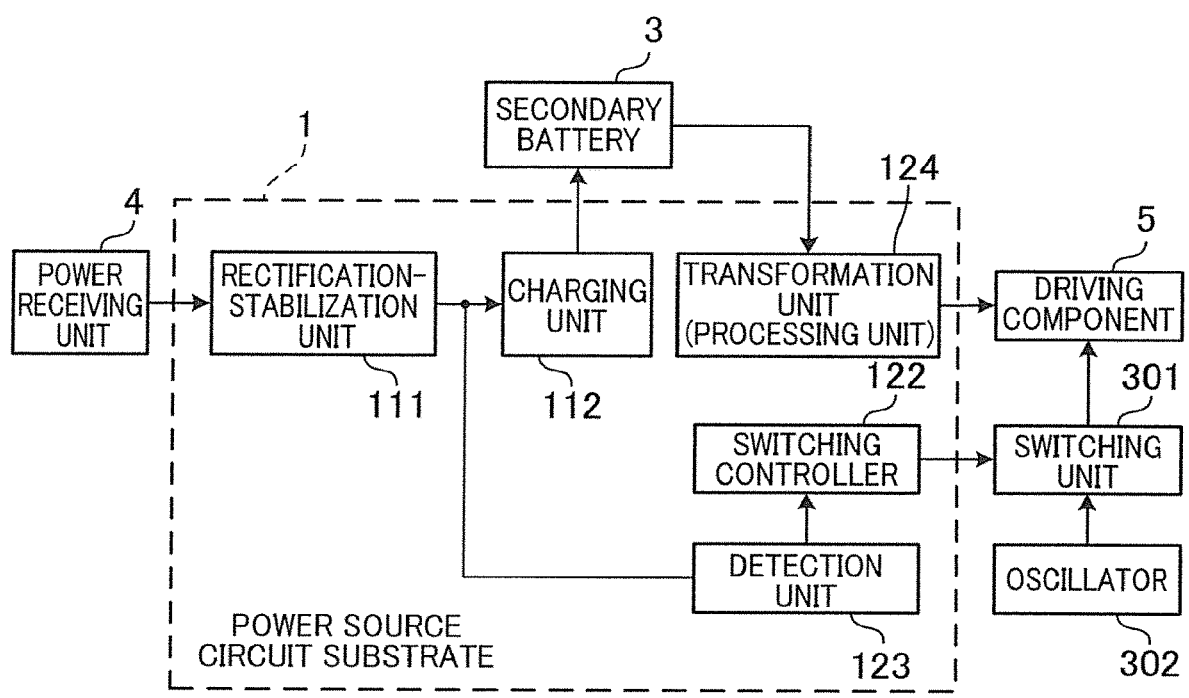
FIG. 14 is a detailed block diagram of the power source circuit substrate.

To be more specific, as shown in FIG. 14, the power source circuit substrate 1 includes a charging unit 112 configured to charge the secondary battery 3 by inputting outside power from the outside, a transformation unit (processing unit) 124 driven by the charged power of the secondary battery 3, and a switching controller 303 configured to switch the state of the transformation unit (processing unit) 124 from the operation state to the stopped state only when the charging of the secondary battery 3 by the charging unit 112 is performed. Furthermore, the portable device 6 includes the secondary battery 3, a driving component 5 which is driven by the charged power of the secondary battery 3, a charging unit 112 configured to charge the secondary battery 3 by inputting outside power from the outside, and a switching controller 303 configured to switch the state of the driving component 5 from the operation state to the stopped state only when the charging of the secondary battery 3 by the charging unit 112 is performed. In Embodiment 3, the same reference numerals are assigned to components having substantially identical arrangements as those of Embodiment 1 and the descriptions thereof are omitted, and points of difference from Embodiment 1 are mainly described.

The portable device 6 includes an oscillator 302 configured to output a clock signal, a switching unit 301 configured to allow the clock signal from the oscillator 302 to pass through or block the clock signal, and a driving component 5 connected to the switching unit 301. The driving component 5 includes a digital circuit which operates based on the clock signal from the oscillator 302. The switching unit 301 is a relay which is mechanically or electronically turned on and off.

The switching unit 301 is connected to an output unit of the switching controller 122. The switching controller 122 is connected to the detection unit 123, and causes the switching unit 301 to be open to block the clock signal and changes the driving component 5 to the stopped state when a low-level (or high-level) detection signal is input from the detection unit 123, or causes the switching unit 301 to be closed to allow the clock signal to pass through and changes the driving component 5 to the operation state when a high-level (or low-level) detection signal is input. The arrangements other than the above are identical with those of Embodiment 1.

Figure 15:
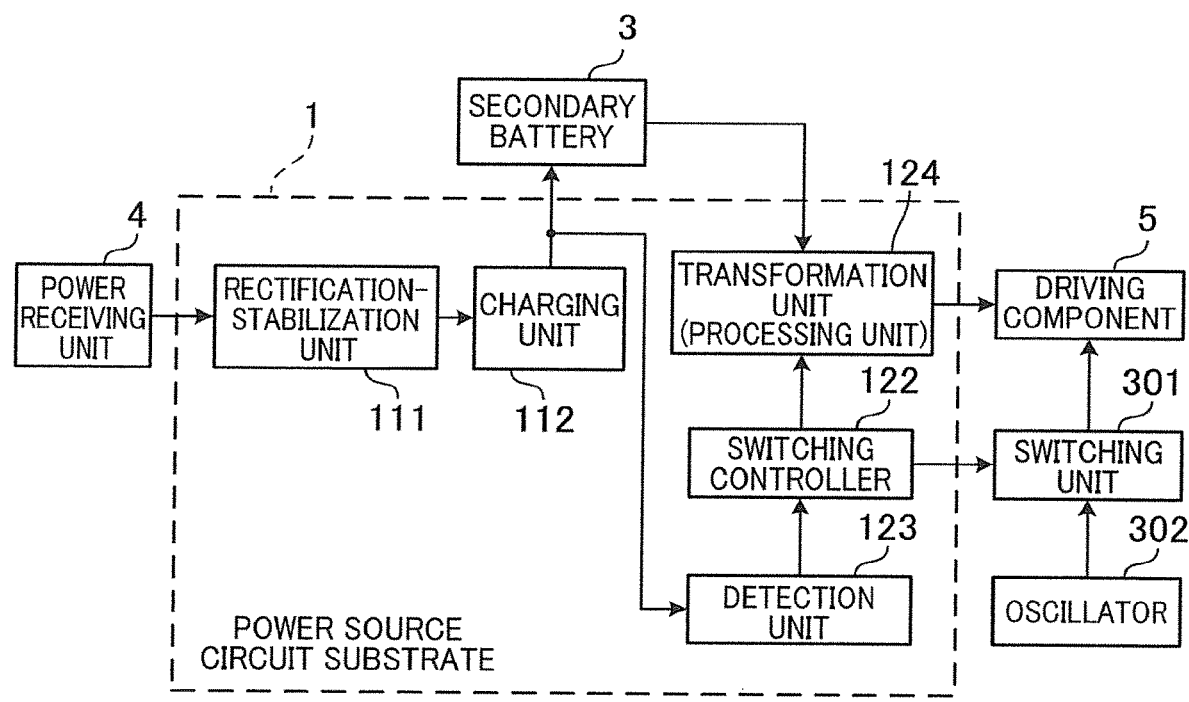
FIG. 15 is a detailed block diagram of the power source circuit substrate.

As shown in FIG. 15, the detection unit 123 may be connected to the output stage of the charging unit 112. The detection unit 123 detects whether the secondary battery 3 is being charged based on an output voltage of the charging unit 112, and outputs the low-level (or high-level) detection signal to the switching controller 122 when the charging is in progress or outputs the high-level (or low-level) detection signal to the switching controller 122 upon the end of the charging.

Figure 16:
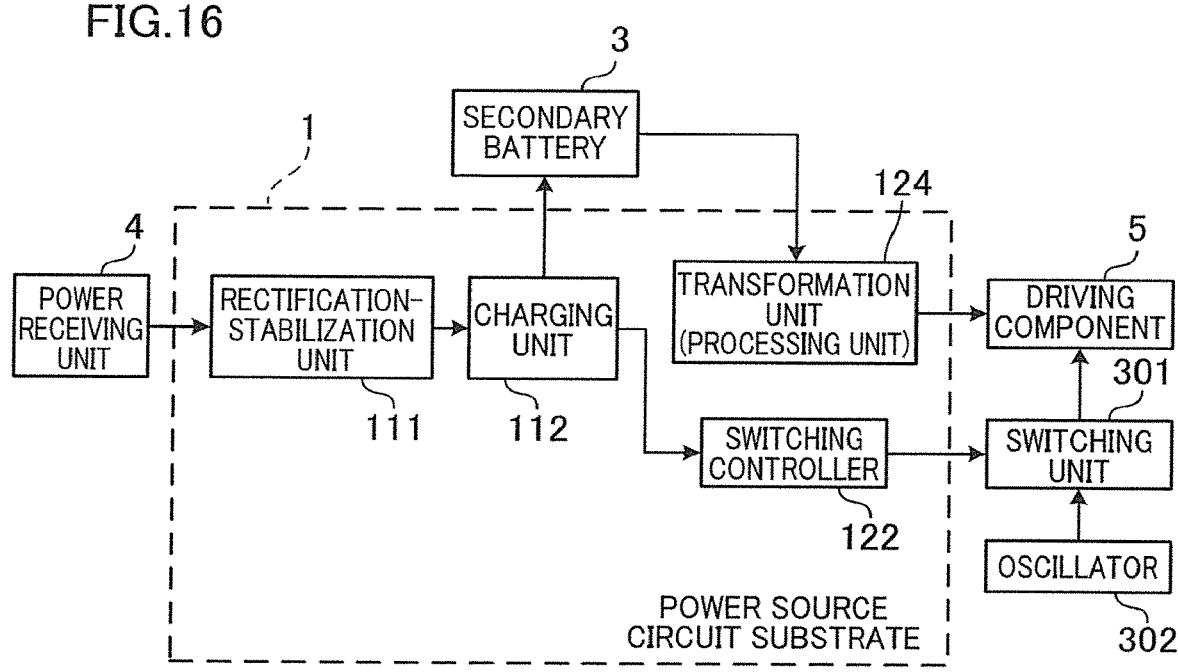
FIG. 16 is a detailed block diagram of the power source circuit substrate.

In addition to the above, as shown in FIG. 16, the charging unit 303 may have a detection function of outputting a detection signal in accordance with a charging execution state and a charging stopped state, and the detection signal may be output from the charging unit 303 to the switching controller 122. The detection unit 123 is unnecessary in this case, and the power source circuit substrate 1 and the portable device 6 are downsized because it is possible to omit the detection unit 123 from the power source circuit substrate 1.

Figure 17:
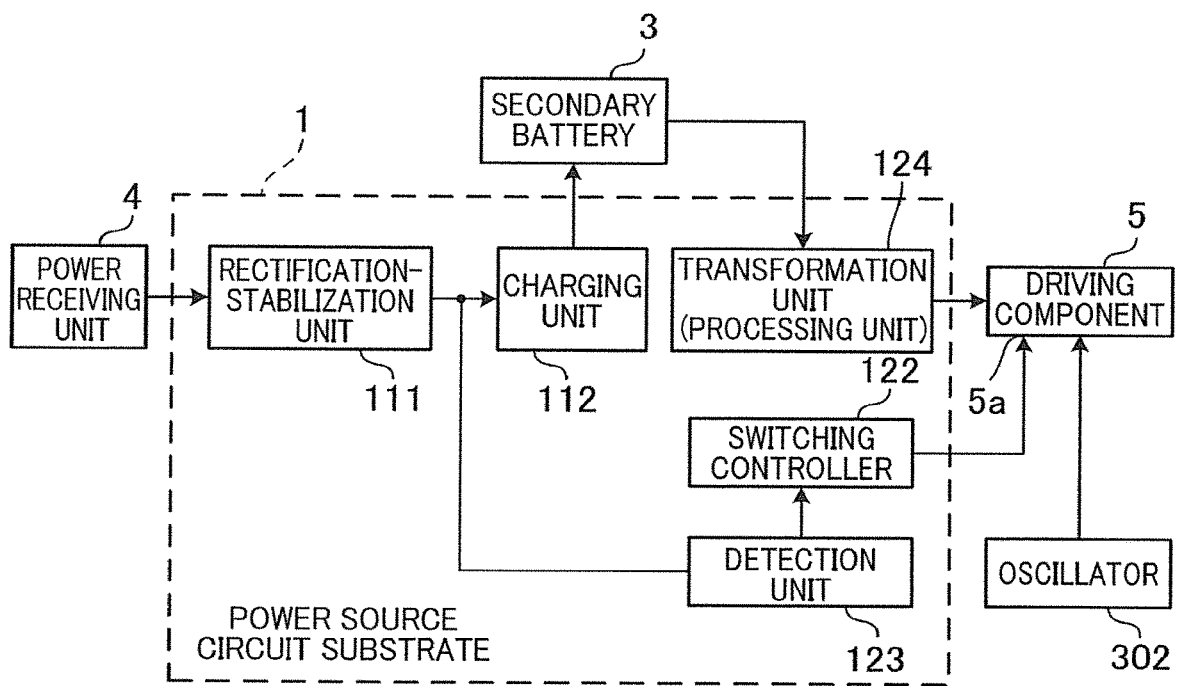
FIG. 17 is a detailed block diagram of the power source circuit substrate.

In addition to the above, as shown in FIG. 17, the driving component 5 may include an enable terminal (EN) 5*a*, and an output unit of the switching controller 122 may be connected to the enable terminal 5*a* when the operation and the stop of the operation are switchable based on an input voltage of the enable terminal 5*a*. The switching unit 301 is unnecessary in this case, and the power source circuit substrate 1 and the portable device 6 are downsized because it is possible to omit the switching unit 301 from the power source circuit substrate 1.

The switching controller 122 may be arranged such that the output unit is connected also to the transformation unit (processing unit) 124, and the target of output of a switching signal is switchable between the switching unit 301, the enable terminal 5*a* of the driving component 5, and the transformation unit (processing unit) 124. In this case, a complete stop mode focusing on the power consumption and a standby mode focusing on the boot time are realized by suitably switching the target of output of the switching controller 122.

To be more specific, in the complete stop mode, the power consumption of the driving component 5 is reduced by completely stopping the power supply to the driving component 5 as the switching controller 122 stops the transformation unit (processing unit) 124. In the meanwhile, in the standby mode, as the switching controller 122 changes the switching unit 301 to the open state while maintaining the transformation unit (processing unit) 124 to be in the operation state, the operation of the driving component 5 is stopped but the power supply to the driving component 5 is maintained, with the result that prompt activation is performed when the clock signal is input. With this, when a plurality of driving components 5 are provided, optimum balance between the boot time and the power consumption is achieved in the power source circuit substrate 1 and the portable device 6 by suitably using the complete stop mode or the standby mode in accordance with the type and use of each driving component 5.

While in Embodiment 3 the oscillator 302 and the switching unit 301 are provided outside the power source circuit substrate 1, at least one of the oscillator 302 and the switching unit 301 may be mounted on the power source circuit substrate 1. Furthermore, while in Embodiment 3 the transformation unit 124 is taken as an example of the processing unit, another circuit configuration may be employed as the processing unit and the operation of this processing unit may be suitably switched. When this processing unit is arranged to operate based on a clock signal, the processing unit may be switched by the switching unit 301 in the power source circuit substrate 1.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to Embodiments 1 and 2 in the above description. Further, the terms and phraseology used in the present specification are adopted solely to provide specific illustration of the present invention, and in no case should the scope of the present invention be limited by such terms and phraseology. Further, it will be obvious to those skilled in the art that the other structures, systems, methods and the like are possible, within the spirit of the invention described in the present specification. The description of claims therefore shall encompass structures equivalent to the present invention, unless otherwise such structures are regarded as to depart from the spirit and scope of the present invention. To fully understand the object and effects of the present invention, it is strongly encouraged to sufficiently refer to disclosures of documents already made available.

REFERENCE SIGNS LIST

1 POWER SOURCE CIRCUIT SUBSTRATE
3 SECONDARY BATTERY
4 POWER RECEIVING UNIT
5 DRIVING COMPONENT
6 PORTABLE DEVICE
7 CHARGER
8 CHARGING SYSTEM
9 EAR-HOOK HEARING AIDS
10 MODULE COMPONENT
61 POWER-RECEIVING MODULE
71 POWER-SUPPLYING MODULE
73 CONTROLLER
74 DISPLAY UNIT
75 WIRELESS COMMUNICATION INTERFACE UNIT
76 ULTRAVIOLET LIGHT EMISSION UNIT
111 RECTIFICATION-STABILIZATION UNIT
112 CHARGING UNIT
122 SWITCHING CONTROLLER
123 DETECTION UNIT
124 TRANSFORMATION UNIT (PROCESSING UNIT)

The invention claimed is:

1. A charging system for a hearing aid comprising:
a secondary battery disposed in said hearing aid;
a power supplying resonance coil that generates a power supplying resonance coil magnetic field in a magnetic field space;
a power receiving module disposed in said hearing aid having a power receiving resonance coil that generates a power receiving resonance coil magnetic field in said magnetic field space, said power supplying resonance coil placed at a distance from said power receiving resonance coil so that said power supplying resonance coil magnetic field interacts with said power receiving resonance coil magnetic field in said magnetic field space such that said magnetic field space has a magnetic field strength, at and around an inner side of said power receiving resonance coil, that is lower than a magnetic field strength surrounding said magnetic field space;
a control substrate disposed in said magnetic field space in said hearing aid to reduce the size of said hearing aid, said control substrate comprising:
a charging unit configured to charge said secondary battery from power supplied by said power receiving resonance coil;
a plurality of transformation units that connect power from said secondary battery to a driving voltage for driving components of said hearing aid;
a detection unit configured to detect power received by said power receiving resonance coil; and
a switching controller that switches at least one of said plurality of transformation units off upon detection of power received from said power receiving resonance coil.

2. The charging system according to claim 1, wherein said hearing aid includes, as one of said driving components, a communication function component configured to send state data indicating a charge state of said hearing aid.

3. A charging system for wirelessly charging a hearing aid comprising:
a charger having a power supplying resonance coil that is connected to an alternating current power source so that said power supplying resonance coil generates a power supplying resonance coil magnetic field;
a power receiving module in said hearing aid, having a power receiving resonance coil that generates a power receiving resonance coil magnetic field in said hearing aid, said power receiving resonance coil placed at a distance from said power supplying resonance coil so that said power supplying resonance coil magnetic field interacts with said power receiving resonance coil magnetic field in a magnetic field space inside said power receiving resonance coil in said hearing aid that has a magnetic field strength, at and around an inner side of said power receiving resonance coil, that is lower than a magnetic field strength surrounding said magnetic field space as a result of interaction of said power supplying resonance coil magnetic field and said power receiving resonance coil magnetic field;
a plurality of transformation units disposed in said magnetic field space, wherein one of said plurality of transformation units is a secondary battery transformation unit that converts power from said power receiving module to a voltage for charging a secondary battery;
a detection unit that detects when said secondary battery is being charged; and
a switching controller that maintains an operational state of said secondary battery transformation unit when said detection unit detects voltage on said charger and turns off other transformation units of said plurality of transformation units.

4. The charging system according to claim 3, wherein said plurality of transformation units, said detection unit, and said switching controller are disposed on an integrated circuit located in said magnetic field space.

5. A charging system for a hearing aid comprising:
- a charger having a power supplying resonance coil that is connected to an alternating current power source so that said power supplying resonance coil generates a power supplying resonance coil magnetic field;
- a power receiving module disposed in said hearing aid having a power receiving resonance coil that generates a power receiving resonance coil magnetic field, said power receiving resonance coil being placed at a distance from said power supplying resonance coil so that said power supplying resonance coil magnetic field interacts with said power receiving resonance coil magnetic field which generates a magnetic field space at and around an inner side of said power receiving resonance coil that has a magnetic field strength that is lower than a magnetic field strength surrounding said magnetic field space;
- at least two processing units disposed in said magnetic field space; and
- a switching controller configured to turn off one of said at least two processing units in response to detection of a secondary battery being charged, causing only said one of said plurality of processing units to stop operation during charging of said secondary battery.

* * * * *